W. G. KIRCHHOFF.
FARE RECORDER.
APPLICATION FILED JULY 21, 1910.

1,256,908.

Patented Feb. 19, 1918.
19 SHEETS—SHEET 1.

Witnesses
George E. Higham.
Leonard W. Novander

Inventor
William G. Kirchhoff
By Brown Williams
Attorneys

W. G. KIRCHHOFF.
FARE RECORDER.
APPLICATION FILED JULY 21, 1910.
1,256,908.
Patented Feb. 19, 1918.
19 SHEETS—SHEET 2.
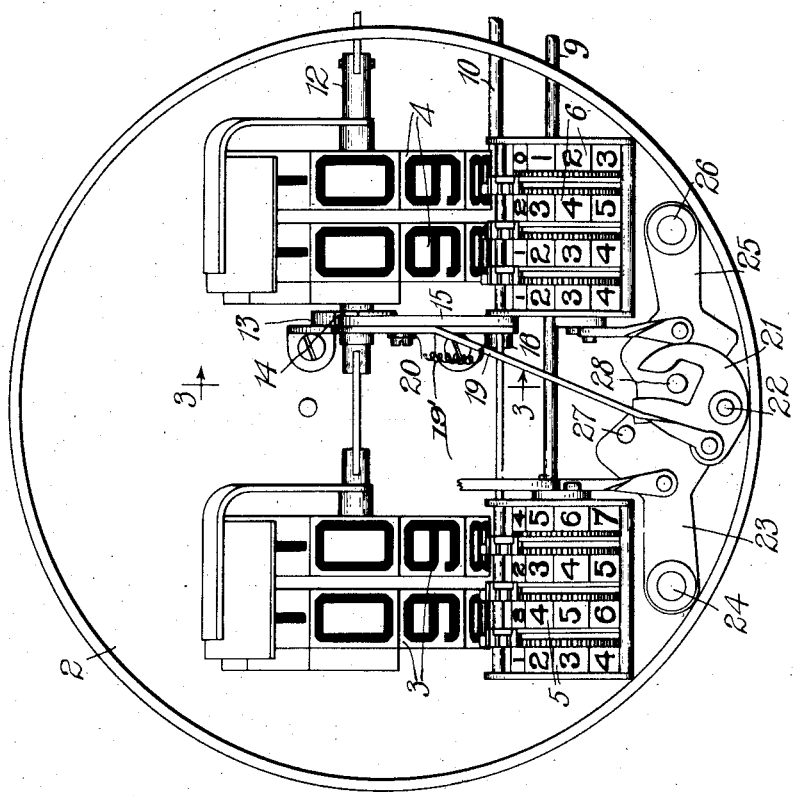

W. G. KIRCHHOFF.
FARE RECORDER.
APPLICATION FILED JULY 21, 1910.

1,256,908.

Patented Feb. 19, 1918.
19 SHEETS—SHEET 4.

Witnesses
George E. Higham.
Leonard W. Novander.

Inventor
William G. Kirchhoff
By Brown & Williams
Attorneys

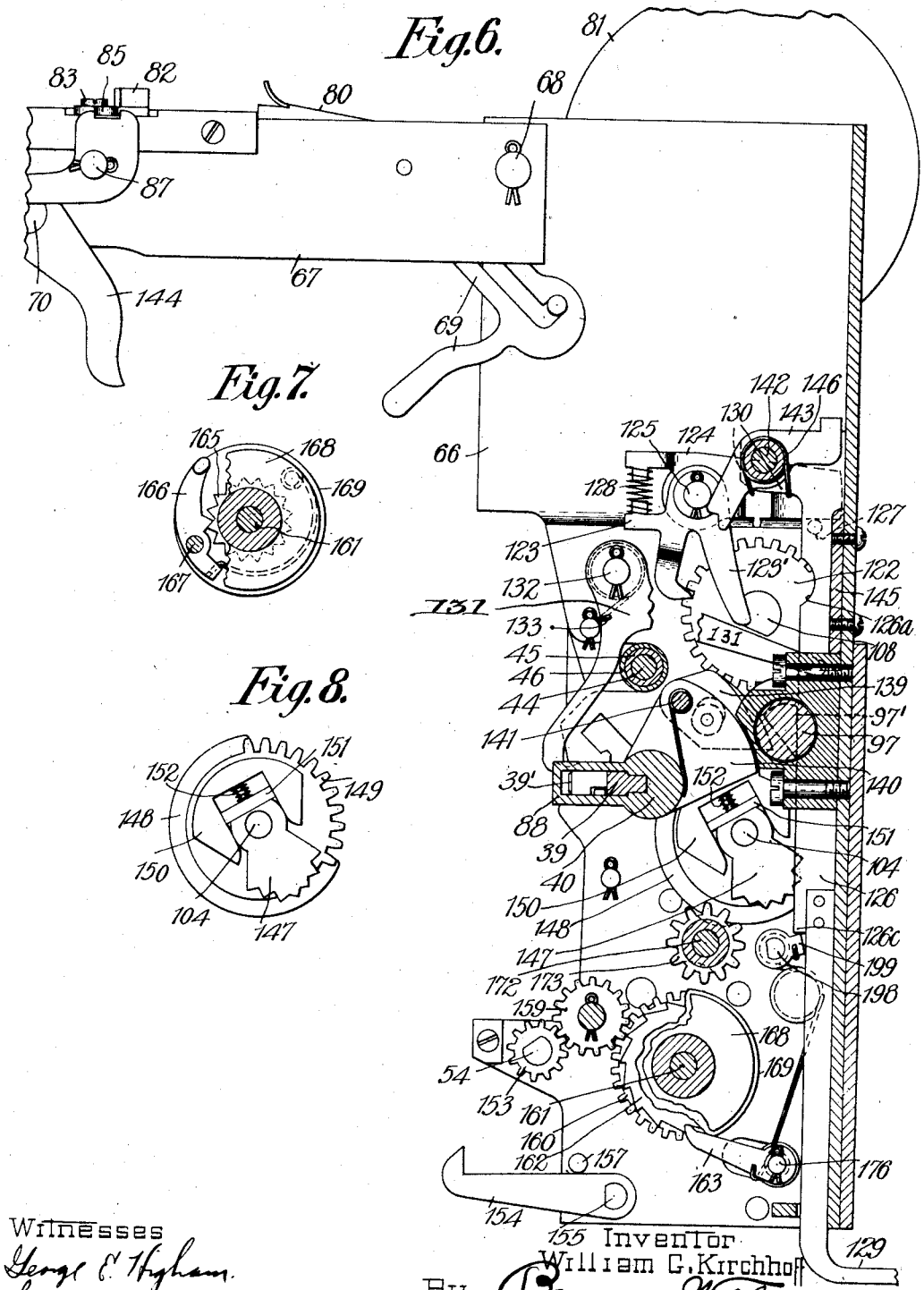

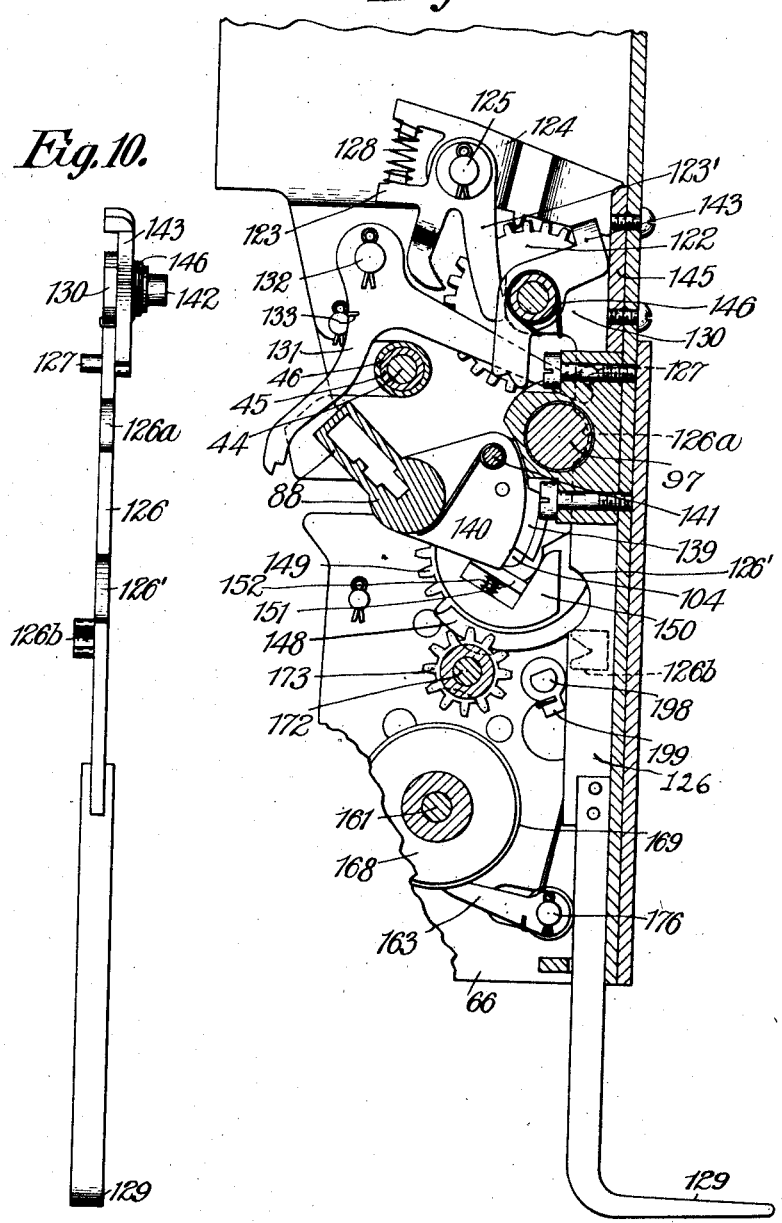

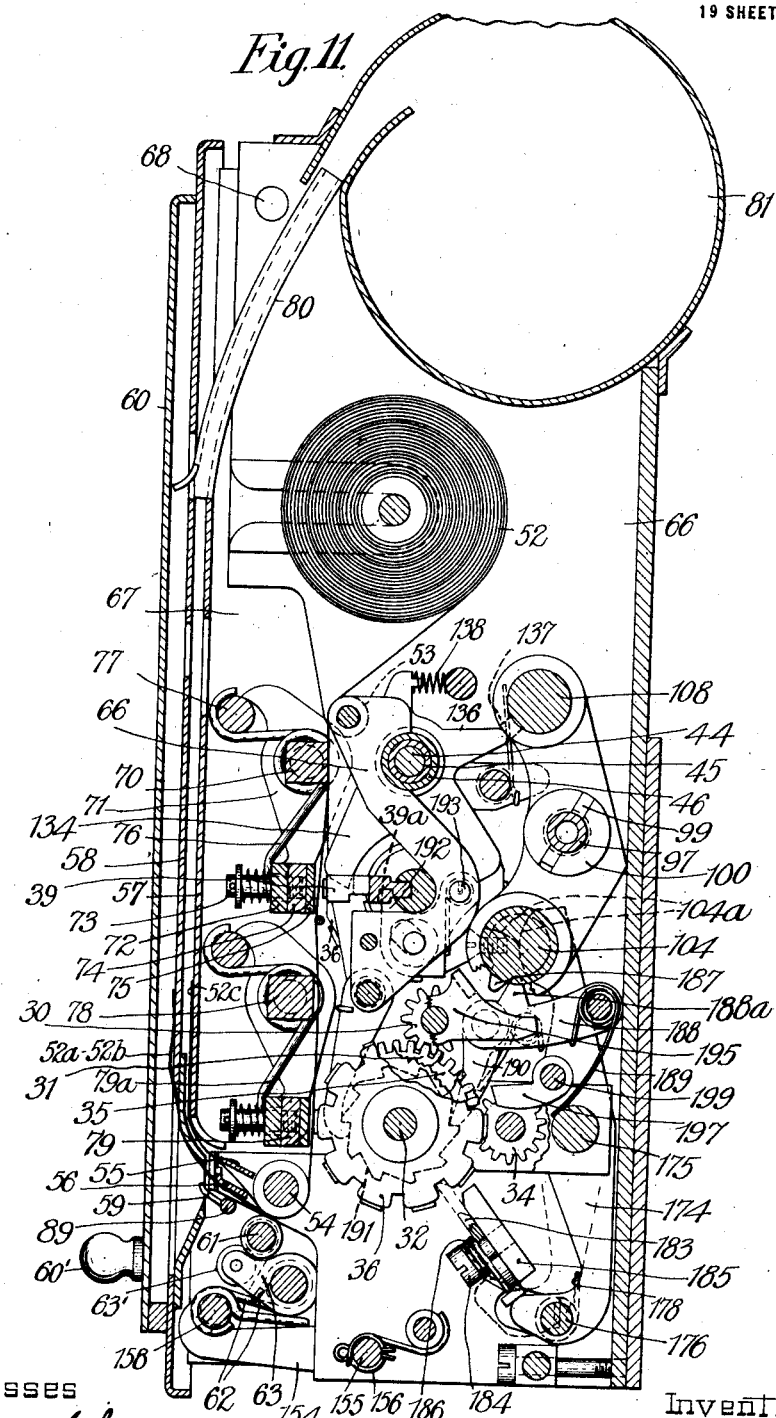

W. G. KIRCHHOFF.
FARE RECORDER.
APPLICATION FILED JULY 21, 1910.

1,256,908.

Patented Feb. 19, 1918.
19 SHEETS—SHEET 8.

Witnesses
George E. Higham.
Leonard W. Novander.

Inventor
William G. Kirchhoff
By Brown Williams
Attorneys

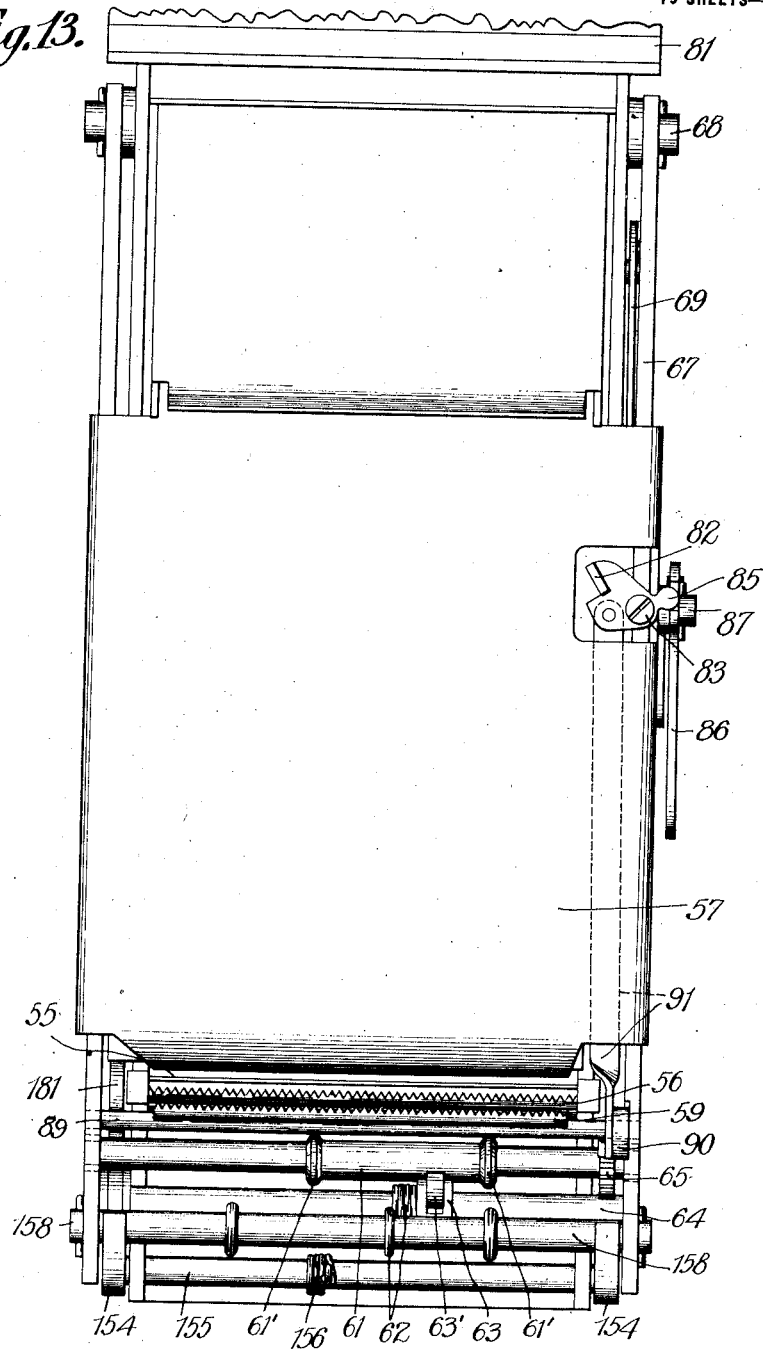

W. G. KIRCHHOFF.
FARE RECORDER.
APPLICATION FILED JULY 21, 1910.

1,256,908.

Patented Feb. 19, 1918.
19 SHEETS—SHEET 10.

Witnesses:

Inventor
William G. Kirchhoff
By Brown & Williams
Attorneys

W. G. KIRCHHOFF.
FARE RECORDER.
APPLICATION FILED JULY 21, 1910.

1,256,908.

Patented Feb. 19, 1918.
19 SHEETS—SHEET 11.

Witnesses:
Leonard W. Novander
George E. Higham

Inventor
William G. Kirchhoff
By Brown Williams
Attorneys

W. G. KIRCHHOFF.
FARE RECORDER.
APPLICATION FILED JULY 21, 1910.

1,256,908.

Patented Feb. 19, 1918.
19 SHEETS—SHEET 12.

Witnesses
George E. Higham
Leonard W. Novander

Inventor
William G. Kirchhoff
By Brown Williams
Attorneys

W. G. KIRCHHOFF.
FARE RECORDER.
APPLICATION FILED JULY 21, 1910.
1,256,908.
Patented Feb. 19, 1918.
19 SHEETS—SHEET 13.
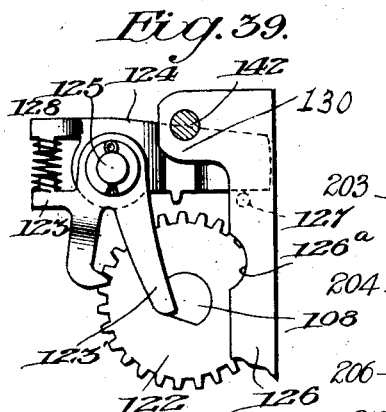
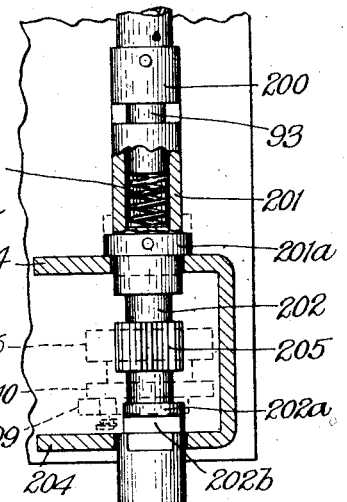
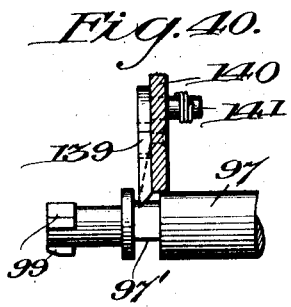
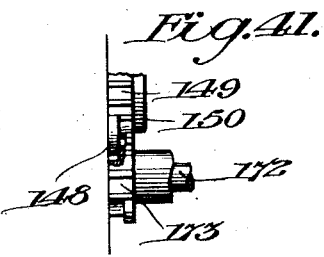
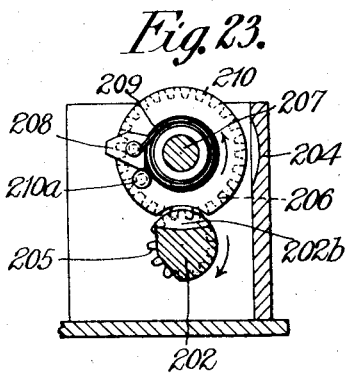
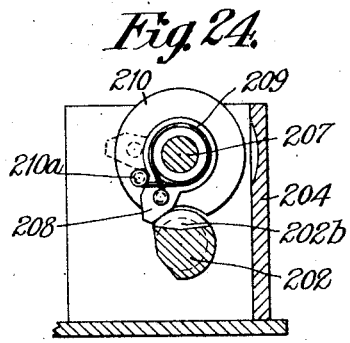
Witnesses
George C. Higham.
Leonard W. Novander.
Inventor
William G. Kirchhoff
By Brown Williams
Attorneys W. G. KIRCHHOFF.
FARE RECORDER.
APPLICATION FILED JULY 21, 1910.
1,256,908.
Patented Feb. 19, 1918.
19 SHEETS—SHEET 14.
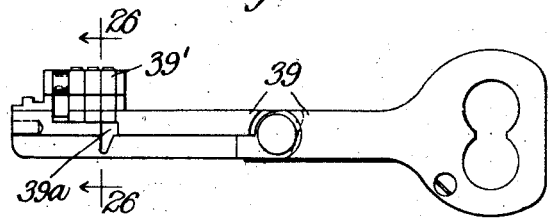
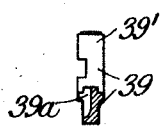
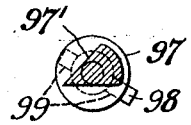
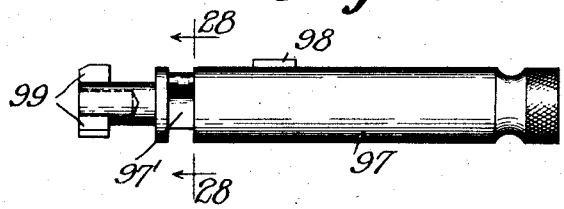
Witnesses
Frank J. Thelen
George E. Higham
Inventor
William G. Kirchhoff
By 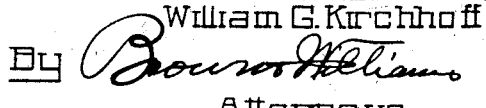
Attorneys W. G. KIRCHHOFF.
FARE RECORDER.
APPLICATION FILED JULY 21, 1910.
1,256,908.
Patented Feb. 19, 1918.
19 SHEETS—SHEET 15.
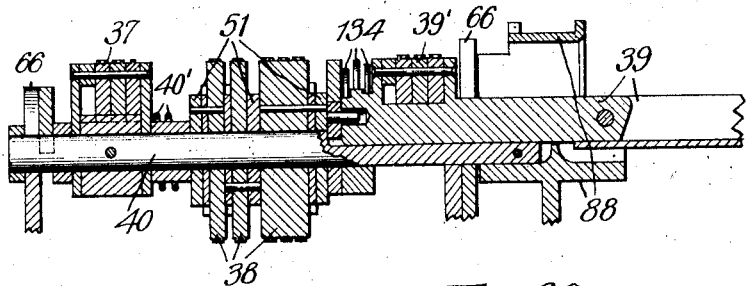
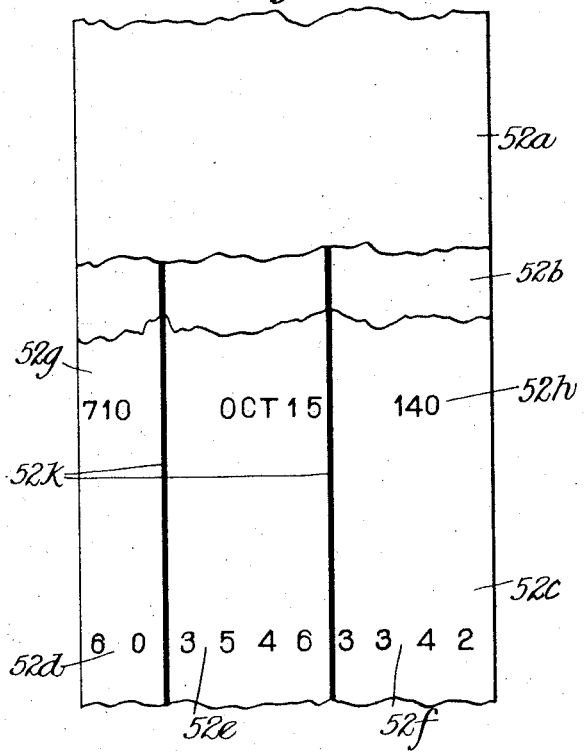
Witnesses:
Leonard W. Novander.
George C. Higham.
Inventor
William G. Kirchhoff
By Browne Williams
Attorneys

W. G. KIRCHHOFF.
FARE RECORDER.
APPLICATION FILED JULY 21, 1910.

1,256,908.

Patented Feb. 19, 1918.
19 SHEETS—SHEET 16.

*Fig.32.*

| | | |
|---|---|---|
| 211K — 712 | OCT 15 | 140 |
| 211n — 6 4 | 3 5 5 8 | 3 5 6 0 |
| 211h — 6 4 | 3 5 5 8 | 3 5 6 0 |
| 211g — 6 3 | 3 5 5 5 | 3 5 5 8 |
| 211f — 6 2 | 3 5 5 4 | 3 3 5 6 |
| 211d — 710 | OCT 15 | 140 |
| 211e — 6 2 | 3 5 5 4 | 3 3 5 6 |
| 211c — 6 2 | 3 5 5 2 | 3 3 5 0 |
| 211b — 6 1 | 3 5 5 0 | 3 3 4 2 |
| 211a — 6 0 | 3 5 4 6 | 3 3 4 2 |

Witnesses
Leonard W. Novander
George E. Higham

Inventor
William G. Kirchhoff
By Brown Williams
Attorneys

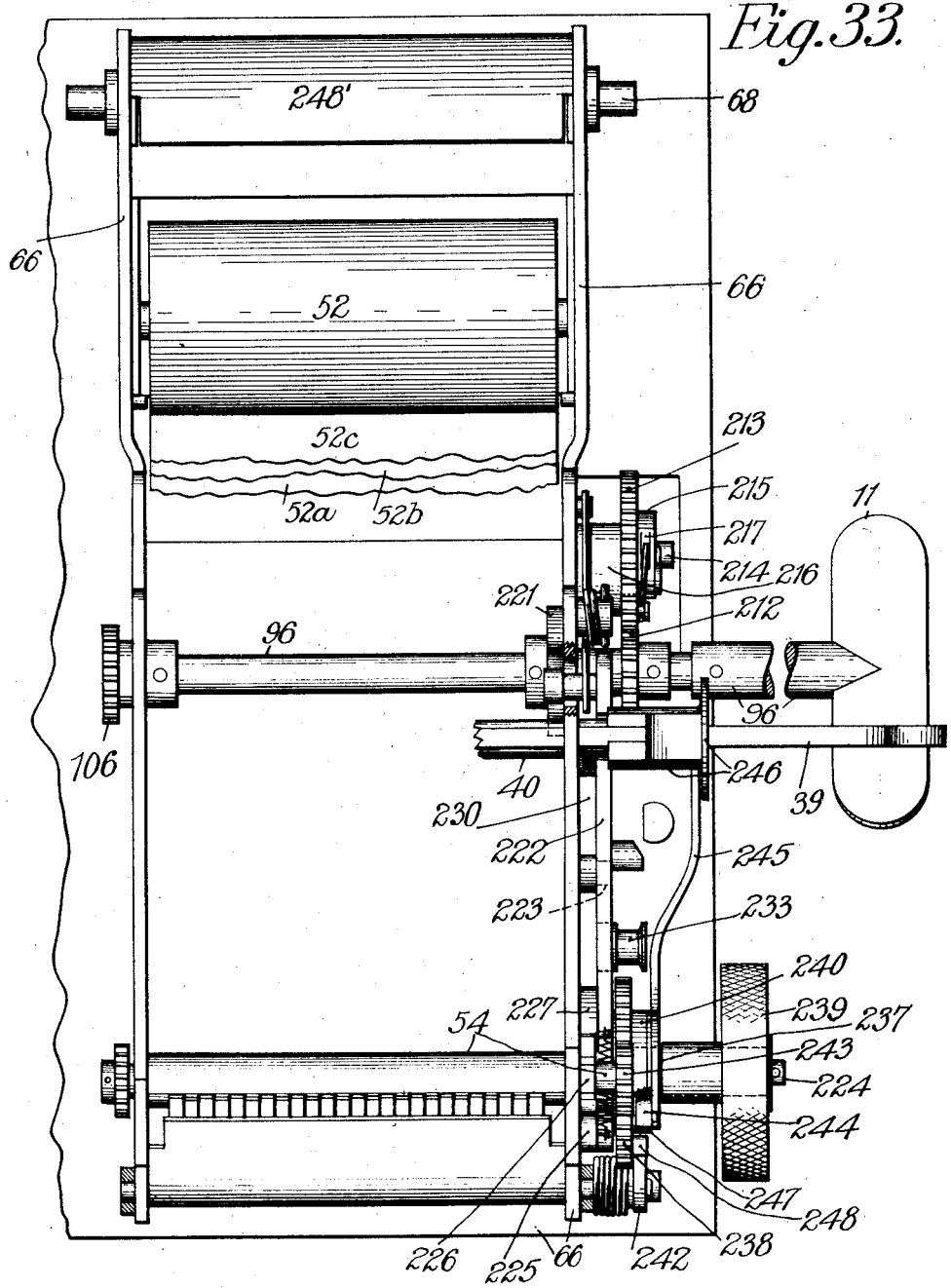

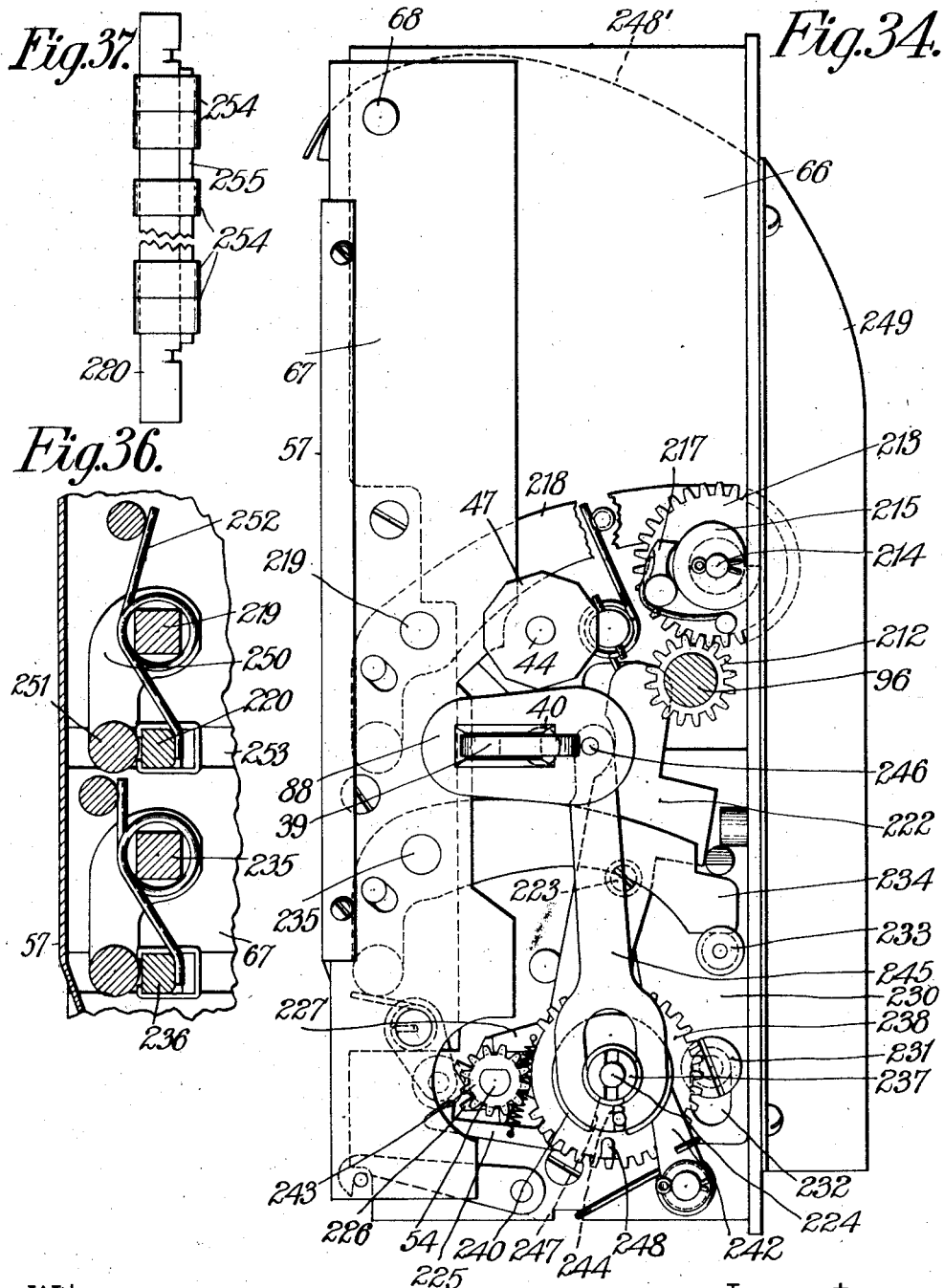

W. G. KIRCHHOFF.
FARE RECORDER.
APPLICATION FILED JULY 21, 1910.

1,256,908.

Patented Feb. 19, 1918.
19 SHEETS—SHEET 19.

Witnesses:
Leonard W. Novander
George E. Higham.

Inventor
William G. Kirchhoff
By Brown Williams
Attorneys

UNITED STATES PATENT OFFICE.

WILLIAM G. KIRCHHOFF, OF CHICAGO, ILLINOIS, ASSIGNOR TO THE INTERNATIONAL REGISTER COMPANY, OF CHICAGO, ILLINOIS, A CORPORATION OF ILLINOIS.

FARE-RECORDER.

1,256,908.

Specification of Letters Patent.

Patented Feb. 19, 1918.

Application filed July 21, 1910. Serial No. 573,126.

*To all whom it may concern:*

Be it known that I, WILLIAM G. KIRCH-HOFF, a citizen of the United States, residing at Chicago, in the county of Cook and State of Illinois, have invented certain new and useful Improvements in Fare-Recorders, of which the following is a full, clear, concise, and exact description, reference being had to the accompanying drawings, forming a part of this specification.

My invention relates to recorders adapted to make a permanent record of the successive readings of a register and is particularly adapted for use in connection with devices of this class employed on cars used to carry passengers.

My recorder consists in the combination of printing mechanism adapted to be advanced to indicate any desired registration as, for example, the number of passengers carried by a car during any particular interval and in combination with such printing mechanism, means by which the attendant or conductor may make a permanent record from the printing mechanism.

My recorder is usually employed in connection with registering mechanism capable of being reset as desired and the resetting means is so connected to the printing mechanism as to make a record at each resetting operation. The resetting handle is also adapted when moved initially from its locking to its releasing position to print a record showing the condition of the registering mechanism.

While I shall refer to the mechanism used in making the record as printing mechanism, it is to be understood that I mean to include by such term any mechanism that may be used to print, emboss, stamp or otherwise communicate to the record strip or strips the condition of the recorder and register.

Since my recorder is particularly adapted for use in connection with passenger cars and is in such connection employed in conjunction with a fare register, it is shown in the accompanying specification and drawings as adapted for this use, although it is to be understood that it may be employed for any similar purpose desired.

In using my invention upon passenger cars, a conductor is provided with an identification key and a connecting plug for both of which he is held responsible to the railway company and the plug is marked to correspond with the characters of the identification key.

My invention includes the combination of a printing bar interlocked with the resetting handle, such printing bar being adapted when actuated to print the conductor's identification and date and the recorder number, while operation of the resetting handle in either direction serves to print the condition of the register and the trip number; suitable interlocks are provided so that the register cannot be operated unless the connecting plug is in place to complete the resetting train of mechanism and the interlocking mechanism referred to requires such a sequence of operation that records must be made upon the strips in the recorder at the ends of the trips and that furthermore the conductor's identification must be printed upon the record before he can have access to his record and release from the recorder his identification key and connecting plug. If the conductor has omitted to insert his identification key, his connecting plug can only be released by an inspector having the required key to open the recorder.

My invention further provides interlocking devices for controlling the position of the identification key to prevent its release, unless the recorder has been properly actuated; feeding mechanism is also provided, adapted to advance the record strips as made uniformly and without distortion.

These and other features of my invention will appear more fully in detail in connection with the description given below of the drawings in which—

Fig. 2 is a view of the register mechanism with the cover plate removed and shows the mechanism employed to lock the register against actuation when the recorder printing mechanism is being operated.

Fig. 3 is a view taken along the line 3—3 in Fig. 2.

Fig. 6 is a view of the parts shown in Fig. 4 taken along the line 6—6.

Fig. 7 is a detail view of ratchet mechanism employed in connection with the paper feed.

Fig. 8 is a detail view of a double pawl used to lock the printing bar.

Fig. 9 is a view of a portion of the parts shown in Fig. 6 in the position assumed by them when the printing bar is moved to its lower position.

Fig. 10 is a plan view of the printing bar and parts carried thereby.

Fig. 11 is a view of the parts shown in Fig. 4 taken along the line 11—11.

Fig. 13 is a plan view of the recorder mechanism with the inner cover in place.

Fig. 22 is a view of the resetting handle showing in dotted lines the lock used to limit its motion.

Fig. 23 is a detail view of the locking mechanism employed in connection with the resetting handle, the lock being shown in its position to permit motion of the resetting handle to the right.

Fig. 24 is a view similar to Fig. 23 showing the lock in its position to prevent further motion to the right of the resetting handle until it is actuated to release the lock.

Fig. 25 is a side view of the conductor's identification key.

Fig. 26 is a sectional view of the conductor's key taken along the line 26—26 in Fig. 25.

Fig. 27 is a detail view of the connecting plug.

Fig. 28 is a sectional view taken along the line 28—28 of Fig. 27.

Fig. 29 is a view of the parts shown in Fig. 4 taken along the line 29—29.

Fig. 30 is a face view of the record made by the printing mechanism.

Fig. 31 is an edge view of the record strips shown in Fig. 30.

Fig. 32 shows in face view a modified record made by the printing mechanism illustrating the relief of one conductor by another.

Fig. 33 is a front elevational view of a modified form of recording mechanism.

Fig. 34 is a side view taken from the right of the parts shown in Fig. 33 and shows the identification key in its printing position.

Fig. 36 is a sectional view taken transversely through the platens shown in Fig. 34 to illustrate their construction.

Fig. 37 is a detail view of one of the platens shown in Figs. 34 and 36.

Figure 1:
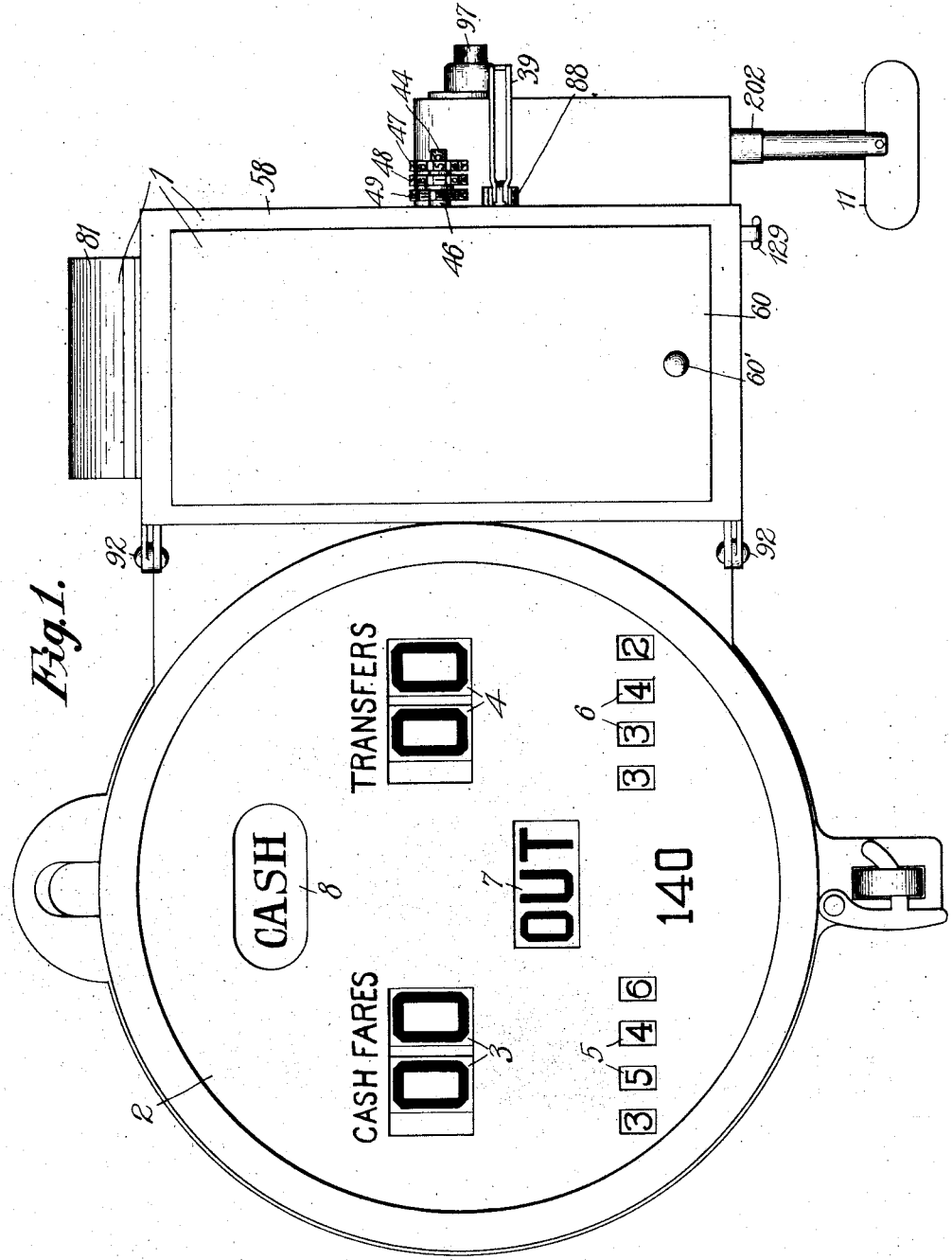
Figure 1 is a face view of the recorder and register complete.

Fig. 39 is a detail view showing the relation between the pawls 123 and 124 and the gear 122.

Fig. 40 is a detail view showing the relation between the plug 97 and the latch 139 used to hold it in operative position.

Fig. 41 is a detail view showing the interlocking relation between the disk 148 and the gear 173.

As shown in Fig. 1, the recording mechanism 1 is associated with a fare register 2 which register is provided with trip indicators 3 and 4 for cash fares and transfers respectively. The register is also provided with totalizers 5 and 6 which indicate the total cash fares and transfers respectively that have been registered by the register 2. A direction indicator 7 and the indicator 8 for showing the nature of the last registration are also provided.

Figure 4:
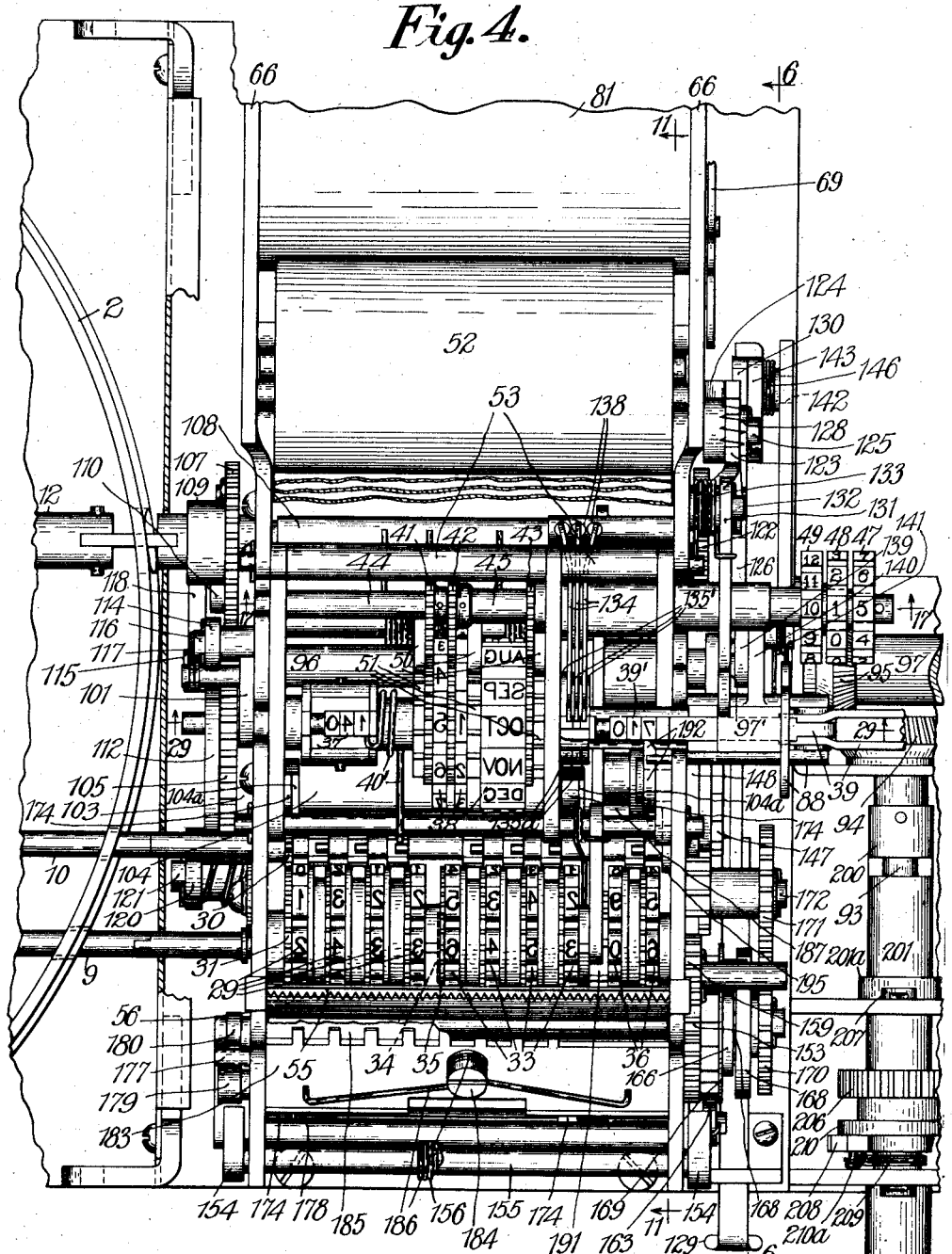
Fig. 4 is a front elevation of the internal mechanism of the recorder.

The register 2 is connected with the recording mechanism by means of the shafts 9 and 10, indicated in Fig. 4, which serve to advance the printing mechanism in the recorder as the totalizers 5 and 6 respectively are advanced. A resetting handle 11 is provided in connection with the recording mechanism and adapted to communicate with the trip registers 3 and 4 by means of a shaft 12 which when operated by the resetting handle 11 rotates the trip register wheels to restore them to their zero position. The fare register here shown does not form a part of this invention since it is the subject matter of United States Patents No. 818,508 and 818,509, issued to A. H. Woodward April 24, 1906. For the purpose of properly understanding the operation of the recorder mechanism it is sufficient to here note that a displacement of the shaft 12 from its normal position during the resetting and printing operations or during the printing operation alone serves to lock the register against actuation. This is accomplished by means of the mechanism shown in Figs. 2 and 3 as follows: The shaft 12 has rigidly secured thereto a collar 13 in which is formed a notch 14. A lever 15 pivoted at 16 to the framework of the register is provided at its upper end with a tooth adapted to engage the notch 14 and such lever carries at the same end a pin 17 working in a slot 18 formed in the upper end of a link 19. The upper end of the link 19 is held in proper position relatively to the pin 17 by means of a link 20 which connects the link 19 with the frame of the register. The link 19 is pivotally connected at its lower end with a locking member 21 pivotally supported upon the register casing at 22. The cash fare trip indicator and totalizer is actuated by a lever 23 pivoted to the register casing at 24 while the transfer trip indicator and totalizer is operated by a similar lever 25 pivoted to the register casing at 26. The levers 23 and 25 are provided with locking pins 27 and 28 respectively which are adapted to be engaged by the locking member 21 when moved to its locking position upon its pivot 22 by downward motion of the link 19 in such a manner as to prevent downward motion of the lever 23 and upward motion of the lever 25 which directions of motion are necessary to cause the operation of the mechanism described. When the shaft 12 is returned to its normal position, which serves to bring the zero indications of the several indicators into view, the lever 15 and link 19 assume their normal positions under the action of a returning spring 19' and thus the locking member 21 is moved to the position indicated in Fig. 2 to release the locking pins 27 and 28.

Downward movement of the link 19 is caused by rotation of the lever 15 about its pivot 16 in a clockwise direction, as viewed in Fig. 3. When the shaft 12 and collar 13 are rotated in a clockwise direction, as shown in Fig. 3, the tooth on the lever 15 is forced out of the notch 14. The downward component of the movement of lever 15 is transmitted to the link 19, which operates the locking member 21.

In the recorder there are mounted printing wheels 29 adapted to be actuated by the operation of the shaft 10 from the transfer totalizer 6. The shaft 10 has secured to it just inside of the left-hand wall of the recorder casing a pinion 30 meshing with a gear 31 secured to the units wheel 29 by which operation of the wheels 29 is effected. Suitable carry-over mechanism is provided between the wheels 29 so that a complete rotation of a wheel of one order advances the wheel of next higher order one unit. The wheels 29 shown in Fig. 4 are loosely supported upon the shaft 32 supported from the framework of the recorder and upon this shaft there is similarly mounted a plurality of wheels 33 adapted to be actuated by the shaft 9 from the cash fare totalizer by means of a pinion 34 shown in Fig. 11 which engages a gear 35 rigidly secured to the units wheel 33. There are also mounted upon the shaft 32 two printing wheels 36 adapted to print the number of the trip upon the record and these wheels are advanced at the end of each trip in a manner to be described.

Above the type wheels 29, 33 and 36, a second set of printing mechanism is disposed consisting of a recorder number 37, date wheels 38 and a conductor's identification mark 39', the latter being carried by a removable key 39. The recorder number 37 and the identification mark 39' are carried by a rock shaft 40 by means of which the recorder number and the identification mark may be removed from their printing position or brought into printing position as the case may be in a manner to be described. The date wheels 38 are loosely mounted upon the rock shaft 40 and are adapted to be individually set by means of the pinions 41, 42 and 43 meshing with gears carried by the wheels 38, such pinions being connected respectively to the shaft 44 and the left-hand ends of the sleeves 45 and 46. The shaft 44 has secured to its right-hand end a setting and indicating disk 47, similar setting disks 48 and 49 being secured to the right-hand ends of the sleeves 45 and 46 respectively. As a result of the construction described, the date wheels 38 may be individually set to bring any desired month and day into the printing line, the setting of the date wheels at any time being indicated by the readings on the edges of the disks 47, 48 and 49 that are centrally disposed on the front edges of such disks. Spring pawls 50 are provided to engage ratchet wheels 51 carried by the date wheels 38 to retain the date wheels in any position to which they are moved.

The record strips used in connection with the printing mechanism just referred to are led from a supply roll 52, shown in Fig. 11, over the guide rollers 53 and down in front of the printing devices above described around a feed roller 54. As shown in Figs. 4, 30 and 31, three separate strips of paper are employed of which the two nearest to the printing devices are coated on their faces away from the printing devices with finely divided carbon, while the third strip is plain. The record strips after being led together from the supply roll 52 around the feed roll 54 are separated, as indicated in Fig. 11, the plain strip being led between the guides 55 and 56 into a space between the plate 57 and the inner cover 58 of the recorder, while the two coated record strips are led between the guides 56 and 59 and up into the space between the inner cover 58 and the outer cover 60 of the recorder. As the strips pass around the feed roll 54 they are engaged by a coöperating feed roll 61, shown more clearly in Fig. 13, which feed roll has formed thereon two flanges 61' which are the only portions of the feed roll engaging the record strips. These flanges thus serve to not only feed the strips from the recorder into the receiving spaces above referred to but also to mark upon such strips vertical lines separating the different portions of the record in a manner to be described. The feed roll 61 is held in engagement with the feed roll 54 by means of a lever 63 which carries at its outer end a roller 63' bearing upon the feed roll 61. The lever 63 is pivotally supported upon the rod 64 and is caused to engage the feed roll 61 nearer the right-hand one of the flanges 61' than the left-hand one of such flanges, and this is done to compensate for the thrust exerted upon the pinion 65 secured to the feed roll 61 to drive it when such feed roll is actuated. As a result during the driving operation uniform pressure is exerted upon the two flanges 61' and the record strips are therefore fed through the recorder without tendency to displace them from their proper course.

Figure 12:
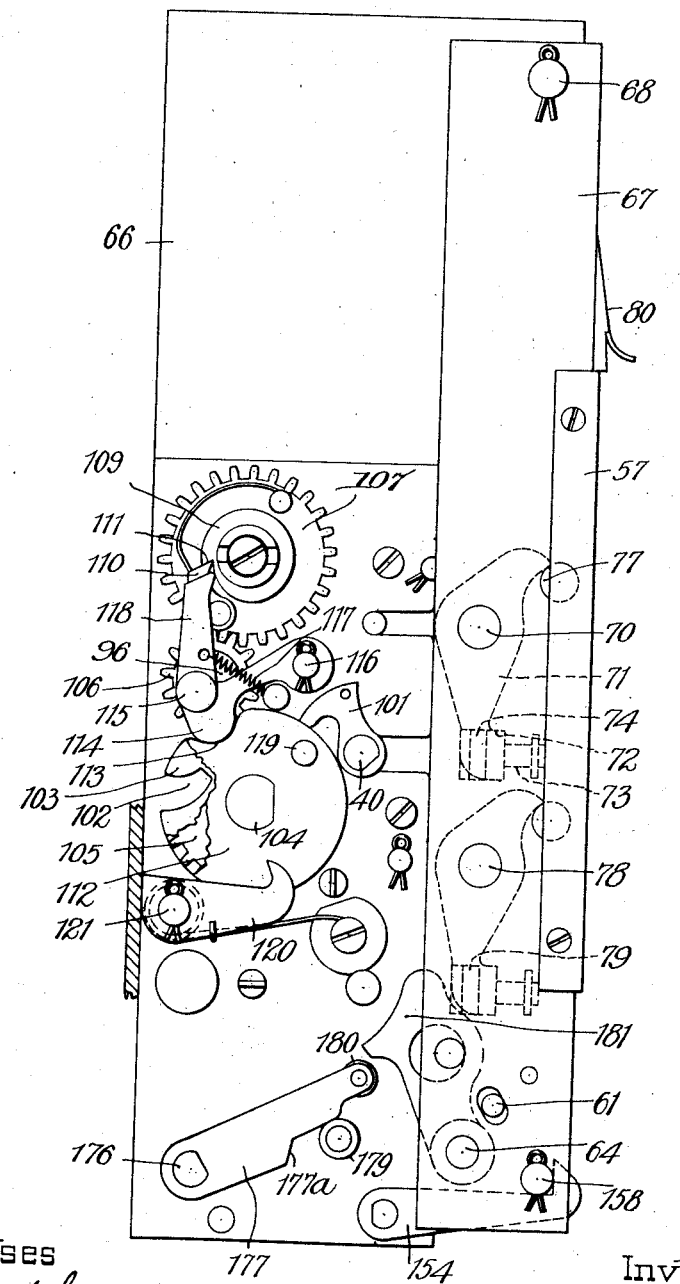
Fig. 12 is a view of the left-hand side of the recorder showing the mechanism mounted thereon.

The frame of the recorder mechanism is constructed in two parts 66 and 67 pivoted together at 68, as shown in Figs. 6 and 12, in order that the plates 57 and 58 and the sliding cover 60 may be moved from in front of the recorder mechanism to the position indicated in Fig. 6, in which position the portion 67 is held by a spring catch 69, as desired, to facilitate threading the strips of paper from the supply roll 52 through the recorder and into the proper position relatively to the plates 57 and 58. The portion 67 of the recorder frame has extending transversely thereof a shaft 70 to which are secured two arms 71, between the lower ends of which there is connected a bar 72, as shown in Fig. 11. The bar 72 has extending therethrough two studs 73, to the inner ends of which a platen 74 is secured. The platen 74 is provided with a facing 75 of resilient material, as rubber, of a proper degree of hardness to properly force the record strips against the characters constituting the register number 37, the date indication 38 and the conductor's identification mechanism 39 when the platen 74 is actuated. The facing 75 is normally not in engagement with the record strips, and is brought into engagement with the strips and thus into engagement with the characters referred to as a result of the inertia of the platen 74 acting against the springs 73' surrounding the studs 73 when the platen is forcibly brought into its normal position by the action of the spring 76 after the platen has been raised and released in a manner to be described. The lever arms 71 are extended upward above the shaft 70 to engage the rod 77 so that the spring 76 serves to normally hold the platen 74 and its facing 75 adjacent to the corresponding printing characters, but just out of engagement with the record strips.

The portion 67 of the frame-work of the recorder has extending transversely thereof a shaft 78 similar to the shaft 70 which serves to support a second platen 79 similar to the platen 74 adjacent to the printing characters carried by the wheels 29, 33 and 36, such platen 79 being normally held out of engagement with the record strips and brought into engagement therewith and therefore into engagement with the adjacent printing characters in the manner described for the platen 74.

The portion 67 of the recorder frame carries at its upper end a receiving tube 80 adapted to receive the record strips as they pass upward between the plates 57, 58 and the slide 60, and direct such record strips into the receptacle 81, in which they are rolled up by being continuously fed into the same until it is desired to remove the records from the recorder. It is to be noticed that the natural set of the record strips, due to their being rolled upon the supply roller 52, is in a direction to facilitate their rolling up in the receptacle 81, which is of practically a cylindrical conformation.

Figure 5:
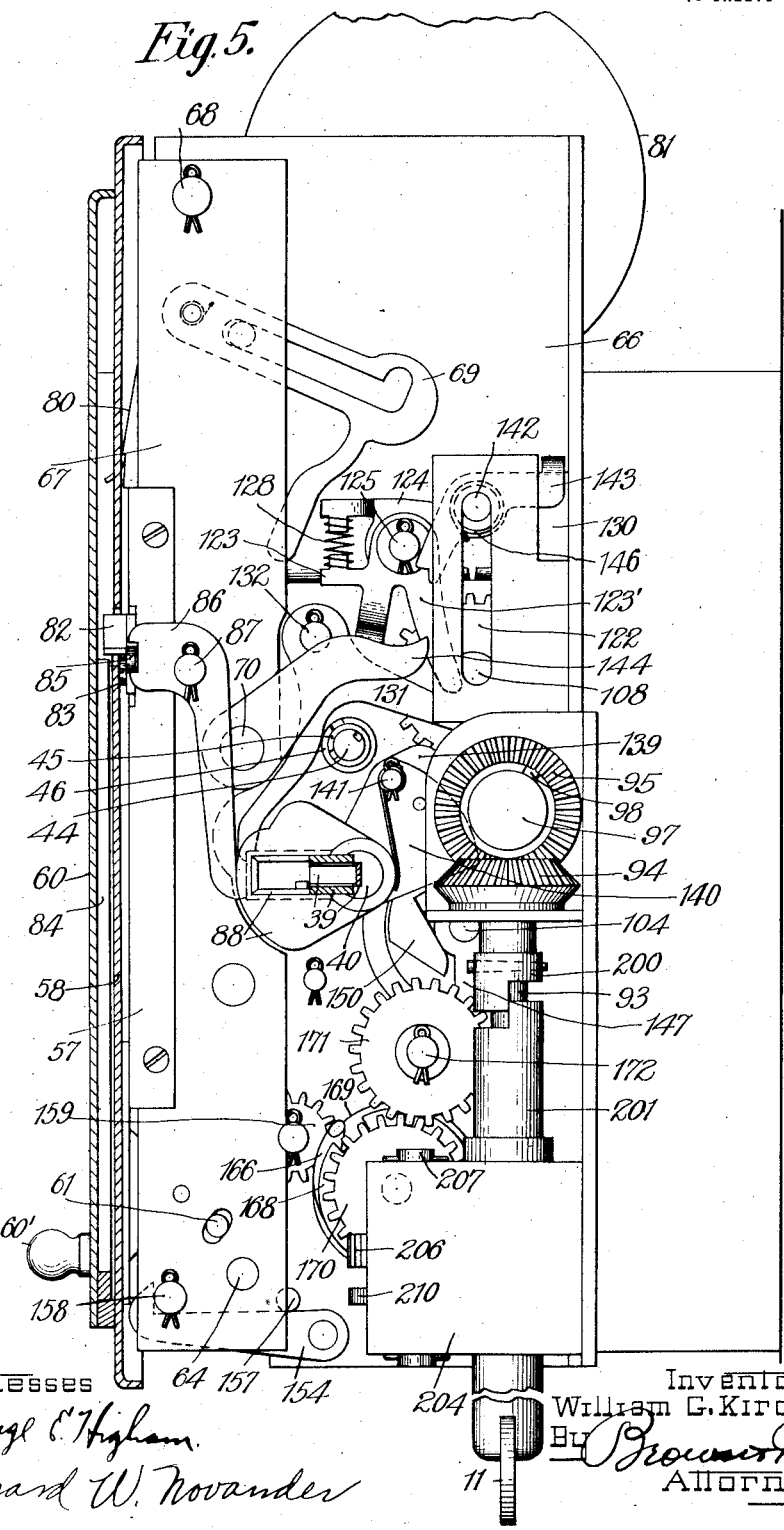
Fig. 5 is a view from the right of the parts shown in Fig. 4, the receiving passageway for the conductor's record being shown in section.
Figure 14:
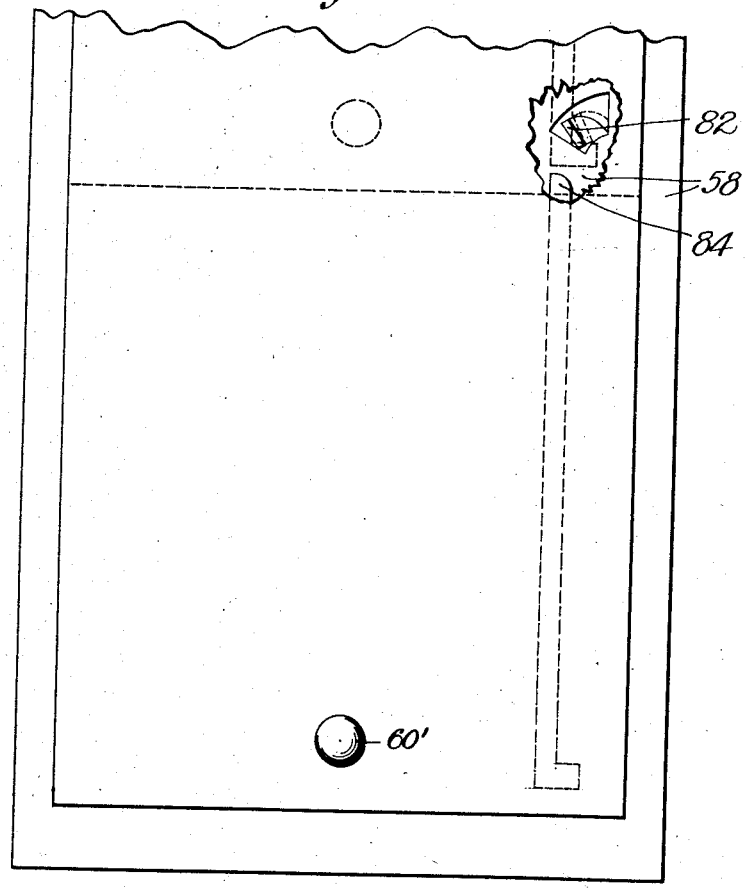
Fig. 14 is a fragmentary elevation of the recorder showing the conductor's slide and the lock for controlling its operation.
Figure 17:
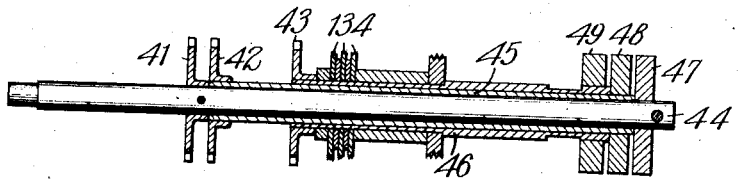
Fig. 17 is a sectional view taken along the line 17—17 in Fig. 4.

As shown in Figs. 5, 13 and 14, a locking member 82 is pivoted to the frame-work 67 at 83 to normally lie in the path of a flange 84 carried by the sliding cover 60 to prevent operation of such cover to remove the records.

The locking member 82 projects through the plates 57 and 58, as indicated in the drawings, to engage the flange 84, as described. The member 82 has formed thereon, as indicated in Fig. 13, a lug 85 engaging the shorter end of a bell-crank-lever 86 pivoted to the frame 67 at 87, the longer end of such lever being disposed over the key escutcheon 88 carried by the right-hand end of the shaft 40, when the key escutcheon is moved to its printing position, and for this position of the escutcheon the lever 86 is moved to bring the locking member 82 into the path of the flange 84. When the rock-shaft 40 is moved away from its printing position, as will be described, the lever 86 is free and the locking member 82 may be moved out of the path of the flange 84 by upward motion of the sliding cover 60. A handle 60' is provided to facilitate this operation.

The guides 56 and 59 for the record strips are serrated, as indicated in Fig. 13, and the guide 59 is mounted upon a shaft 89, to the right-hand end of which a crank 90 is secured, which crank is connected by the link 91 with the locking member 82, the connecting parts just described being so proportioned that when the locking member 82 is moved out of the path of the flange 84 by motion upward of the sliding cover 60 the guide 59 is brought forcibly into engagement with the back of the guide 56, and thus the two record strips between the plate 58 and the sliding cover 60 are clamped in a position to facilitate their being torn from the main portions of such strips by means of the serrated guide 59. It is further to be noted that with the sliding cover 60 in its upper position and the lever 86 rotated upon its pivot 87 by the action of the locking member 82, the escutcheon 88 cannot be moved from its inoperative position to its printing position.

As shown in Fig. 1, the frame 58 upon which the sliding door 60 is mounted, is hinged to the portion 67 of the frame at 92, and the frame-work 58 is normally held in the position indicated by means of a suitable lock, not shown, which is under the control of the inspector or auditor, so that by raising the frame-work 58 the auditor's record may be removed from the recorder.

Figure 15:
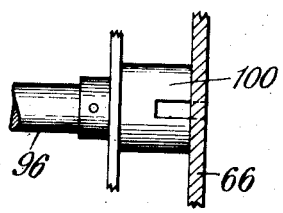
Fig. 15 is a detail view of the portion of the resetting train of mechanism adapted to receive the connecting plug.

The resetting handle 11 is connected to the lower end of the shaft 93, and to the upper end of this shaft a bevel-gear 94 is secured, meshing with a similar bevel-gear 95 supported by the frame-work 66 of the recorder. The gear 95 is disposed in alinement with the shaft 96, but is normally disconnected therefrom and free to rotate without actuating any of the recording mechanism. A connecting plug 97 which is carried by the conductor and has marked upon it his characteristic indication corresponding with the indication carried by his identification key 39, is adapted to engage the gear 95 by means of a key 98 formed on such plug, as shown in Fig. 27, and in this position the keys 99 formed on the left-hand end of the connecting plug engage a slotted member 100 rigidly secured to the right-hand end of the shaft 96 as indicated in Fig. 15.

When the recorder is not in use the shaft 40 occupies its inoperative position and the connecting plug 97 is not in place in the gear 95, and for this position of the shaft 40, whether the connecting plug 97 is in place or not, rotation of the shaft 96 is impossible, and therefore the resetting handle 11 cannot be rotated to the right when the plug 97 is in operative position. This locked condition results from the following construction: The shaft 40 has secured to its left-hand end, as shown in Figs. 4 and 12, a hook 101 adapted to engage a notch 102 formed in the periphery of a disk 103 carried by the left-hand end of the shaft 104, which shaft has also secured to its left-hand end a gear 105 meshing with a pinion 106 carried by the left-hand end of the shaft 96. The pinion 106 also meshes with a gear 107 secured to the left-hand end of a shaft 108 which is in axial alinement with a sleeve 109 secured to the right-hand end of the resetting shaft 12. As shown in Fig. 4, the sleeve 109 and the gear 107 are disconnected from each other, but such gear is adapted to drive the sleeve when rotated in a clockwise direction by means of a spring pawl 110 carried by the gear, which is adapted to engage a notch 111 formed in the periphery of the sleeve 109. As a result of the gearing described, when the pinion 106 is rotated in a counter-clockwise direction the gear 107 is rotated in a clockwise direction, and by means of the pawl 110 rotates the sleeve 109 in a clockwise direction, as shown in Fig. 12, and serves to return the register indicators 3 and 4 to their zero indications. Fig. 12 shows the parts in a position to release the register mechanism so that the registers may be advanced as successive fares are paid. As described above, the operating members 23 and 25 of the register are blocked against actuation when the shaft 12 is rotated from its normal position, and this locked condition continues during the entire resetting operation, which consists in a complete rotation of the shaft 12. When the resetting handle 11 is moved around to the left, the pinion 106 is moved in a clockwise direction, thus rotating the gears 105 and 107 in a counter-clockwise direction, for which motion the pawl 110 does not operate the sleeve 109, but recedes from the notch 111 on the periphery of the sleeve 109. The shaft 104 has secured to its left-hand end, in addition to the disk 103 and the gear 105, a disk 112 which has formed in its periphery a cam notch 113 in which the lower left-hand end of a lever 114 pivoted to the frame of the recorder at 116 is normally held by the action of a spring 117. The left-hand end of the lever 114 has pivoted thereto at 115 a pawl 118 normally disposed so that its nose is slightly back of the nose of the pawl 110 and resting against the periphery of the sleeve 109. From the construction described it will be apparent that motion in either direction of the shaft 104 will move the lever 114 around to the right until its left-hand end rests upon the periphery of the disk 112, and that such motion therefore will move the pawl 118 in a direction to rotate the sleeve 109 around to the right. When the shaft 104 is moved in a clockwise direction this motion of the pawl 118 does not serve to move the sleeve 109, since such sleeve is actuated at this time by the pawl 110, but for motion in a counter-clockwise direction of the shaft 104 and motion in a similar direction of the gear 107 and the pawl 110 the pawl 118 serves to rotate the sleeve 109 around to the right by engagement with the notch 111 a sufficient amount to lock the registering mechanism against actuation. When the resetting handle 11 is rotated to the left this motion may be continued until a pin 119 carried by the disk 112 engages a spring hook 120 pivoted to the framework of the recorder at 121, which engagement prevents further rotation of the shaft 104 and therefore prevents further rotation of the resetting handle 11. For this position of the parts the notch 102 is in a position to permit the hook 101 to be moved into it under the influence of the spring 40', shown in Fig. 4, and this is the normal condition of the mechanism just described when the recorder is not in use, as a result of which the register-actuating mechanism is locked against operation, and the resetting handle is also locked against actuation. The parts just described in connection with Fig. 12 are shown in the position they occupy at the end of each resetting operation, and during a resetting operation each of the gears 105 and 107 makes a complete rotation, as a result of which, since the ratio of the pinion 106 to such gears is one to two, and the ratio of the bevel-gears 94 and 95 is one to one, the resetting handle 11 makes two complete rotations for each resetting operation. During the resetting operation the pin 119 moving in a clockwise direction engages the beveled outer surface of the right-hand end of the hook 120 and rotates such hook upon its pivot against the action of the spring normally holding it in the path of the pin 119.

Figure 18:
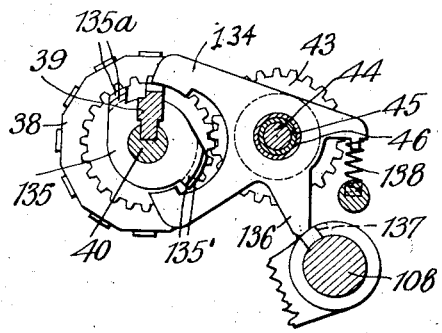
Fig. 18 is a detail view of tumbler mechanism used to coöperate with the identification key, such tumblers being shown in their releasing position and the identification key being shown in its printing position.

The shaft 108 has secured to its right-hand end a gear 122, as indicated in Fig. 6, and this gear 122 is adapted to be engaged by one of the spring pawls 123 and 124 pivoted to the framework of the recorder at 125, depending upon the position of the sliding bar 126 as more clearly shown in Fig. 39. The bar 126 is normally in the position indicated in Fig. 6, and for this position a pin 127 carried by such bar engages the right-hand end of the pawl 124 to move it out of engagement with the gear 122, and for this position of the bar 126 the pawl 123 is free to engage the gear 122 under the influence of the spring 128. For this condition, therefore, motion of the resetting handle 11 is permitted by the pawl 123 around to the right, and motion to the left is prevented. When the bar 126 is moved downward by means of the hook 129 secured to its lower end a projecting lug 130 carried by the upper end of the bar 126 engages a downwardly extending arm 123' formed on the pawl 123 and moves it out of engagement with the gear 122, and at the same time the pin 127 is withdrawn from the right-hand end of the pawl 124, and the spring 128 serves to move such pawl 124 into engagement with the gear 122, as shown in Fig. 9, for which condition motion of the re-setting handle is permitted only in a direction around to the left. When the pin 127 is moved downward by means of the hook 129 it engages one arm of a bell-crank lever 131 pivoted at 132 to the framework of the recorder and normally held in position to engage the key escutcheon 88 by a spring 133 to prevent motion of such escutcheon from its printing to its inoperative position. When the pin 127 engages the bell-crank lever 131 it moves such lever around to the right upon its pivot and disengages the lever from the key escutcheon 88, for which condition the key escutcheon and the shaft 40 carrying the same are free to be rotated to their inoperative position when the notch 102 is brought into alinement with the hook 101 shown in Fig. 12, providing the conductor's identification key 39 is properly in position in the key escutcheon 88. If at this time the conductor's key is not in the escutcheon 88 the escutcheon is retained in its printing position by means of tumblers 134, shown in plan view in Fig. 4 and in detail in Figs. 18 and 19. The tumblers 134 are mounted upon the tube 46 supported by the shaft 44 above described, and extend above and below a collar 135 secured to the shaft 40 in a position to receive the inner end of the conductor's identification key 39. The tumblers 134 have formed upon them rearwardly extending projections 136 adapted to be engaged by a cam 137 carried by the shaft 108, and when the tumblers are not engaged by the cam 137, individual springs 138 serve to move the outer ends of the tumblers into engagement with the key 39. The parts are so proportioned that when the resetting handle is moved around to the right to a position to unlock the register-actuating mechanism the cam 137 is brought into a position to raise all of the tumblers 134 away from the key 39, which motion, however, does not release the collar 135, since the tumblers at this time lie in the path of the projections 135' formed on the rear side of such collar. This position of the tumblers, however, permits the conductor's key 39 to be inserted, if it was not properly inserted when he began operating the recorder. With the key 39 properly in place, the tumblers 134 resting upon its outer edge are held in proper position so that they clear not only the projections 135' on the rear face of the collar 135, but also the projections 130

Figure 19:
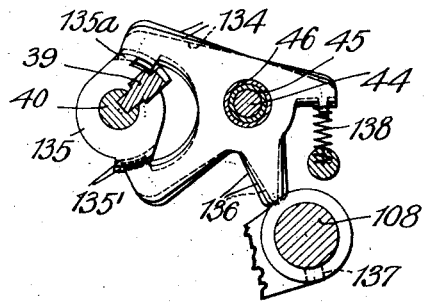
Fig. 19 is a view similar to Fig. 18, the tumblers and key being shown in their released position.

135ᵃ formed on the front of such collar, and thus when the shaft 40 is otherwise released the tumblers do not prevent its motion to its inoperative position, as shown in Fig. 19. When, however, the conductor's key 39 is not in place in the escutcheon 88 the tumblers 134 under the action of the springs 138 rest upon the surface of the collar 135 and engage the projections 135ᵃ, which prevents motion of the shaft 40 to its inoperative position, shown in Fig. 19.

The connecting plug 97 has formed therein a groove 97' adapted to be engaged by a spring catch 139 pivoted to a sector 140 at 141, as indicated in Figs 6 and 9, the sector 140 being carried by the escutcheon 88. The latch 139 is so conformed on its lower edge that when the escutcheon 88 is in its printing position the connecting plug 97 may be inserted through the bevel gear 95, the latch 139 serving to engage the plug when in position to prevent its withdrawal as more clearly shown in Fig. 40. The connecting plug can only be released by motion of the escutcheon 88 to its inoperative position, for which position the latch 139 is moved out of the path of the plug 97, which may then be withdrawn by the conductor. The notch 97' is also engaged by the sliding bar 126 when such bar is not in its upper position, as a result of which it is necessary that such bar be in its normal position before the plug 97 can be withdrawn through a clearance 126' formed in such bar, as indicated in Figs. 9 and 10, for this purpose. A second clearance 126ᵃ is provided in the bar 126 to permit the plug 97 to be rotated when the bar 126 is in its lower position, but this clearance is not large enough to permit the withdrawal of the plug from the recorder.

The projecting lug 130 carried by the upper end of the sliding bar 126 has pivoted thereto at 142, as shown in Figs. 5, 6, 9 and 10. a spring dog 143, the left-hand end of which is so conformed as to engage the right-hand end of the lever 144 when the sliding bar 126 is moved in a downward direction. The lever 144 is rigidly secured to the right-hand end of the shaft 70, as a result of which the engagement described between the dog 143 and the lever 144 moves the platen 74 away from the record strips against the action of the spring 76, which motion continues until the right-hand end of the dog 143, as shown in Figs. 5, 6 and 9, engages the cam plate 145 secured to the recorder frame 66, which engagement rotates the dog 143 upon its pivot against the action of the spring 146, as shown in Fig. 9, thereby causing disengagement of the dog from the lever 144. The lever 144 being thus released, the platen 74 is moved violently in the direction of the recorder number, the date, indications, and the conductor's identification mark, and, as above described, the inertia of the platen 74 sufficiently overcomes the springs 73' to force the record strips against the printing characters referred to in a manner to imprint upon the record strips such characters. When the sliding bar 126 is again moved to its upper position, the left-hand end of the dog 143 yields under the action of the spring 146 to pass the right-hand end of the lever 144 to again come into operative position relatively to such lever.

The sliding bar 126 is controlled as to the direction of its motion by means of a spring pawl 147, shown in Figs. 5, 6, 8 and 9, as follows: The shaft 104 has secured to its right-hand end a disk 148, a mutilated gear 149 and a flat slotted member 150, as indicated in Figs. 6, 8 and 9. The extreme right-hand end of the shaft 104 pivotally supports the pawl 147, which is flattened on its inner end to engage a bar 151 disposed in the slot formed in the member 150, and this bar is held in position against the flattened surface referred to by means of a spring 152. Thus, motion in either direction of the pawl 147 from its normal position is permitted. When the resetting handle 11 is in a position to unlock the register-actuating mechanism, above referred to, the shaft 104 occupies the angular position indicated in Fig. 6, and for this position the sliding bar 126 is free to be moved in a downward direction, and when so moved a ratchet 126ᵇ carried by the bar 126, as shown in Figs. 9 and 10, engages the pawl 147, which serves to prevent upward motion of the bar 126 after it has been moved downwardly. It is to be observed that the ratchet 126ᵇ and the pawl 147 engage each other before the bar 126 is moved to its extreme lower position, and that when once engaged motion of the bar 126 can only be effected in a downward direction for this condition of the pawl 147, until its extreme lower position is reached, and that the sliding bar is locked in this position until the resetting handle 11 is rotated to the left, which is the only direction of motion now permitted owing to the engagement of the pawl 124 with the gear 122 and the disengagement of the pawl 123 from such gear, caused by the downward motion of the sliding bar 126. When the resetting handle is moved to the left as far as it can be rotated, the shaft 104 is moved sufficiently in a clockwise direction, as shown in Figs. 6 and 9, to rotate the pawl 147 to the position indicated in Fig. 9, for which position the ratchet 126ᵇ is released and the sliding bar 126 may be moved upward. When the bar is thus moved, the ratchet 126ᵇ again engages the pawl 147, and, as before, when once engaged motion in the opposite direction of the sliding bar is prevented, and it can only be moved to its extreme position, which for this condition of the apparatus is its extreme uppermost position. When thus moved to its upper position, as above described, the sliding bar 126 serves to again bring the pawl 123 into engagement with the gear 122 and to remove the pawl 124 from engagement with such gear, and thus operation of the resetting handle is permitted only to the right.

The right-hand end of the feed roll 54, as shown in Figs. 6 and 11, has secured thereto a gear 153 with which the gear 65 shown in Fig. 13 meshes when the portion of the frame 67 is in operative position relatively to the portion 66 of such frame. The two portions of the frame are held in this position by means of hooks 154 secured to the ends of a shaft 155 to prevent separation of the frame during the printing operation. The shaft 155 is carried by the portion 66 of the framework, and has connected thereto a spring 156, as shown in Fig. 4, which maintains the hooks against stops 157 in position to engage a rod 158 carried by the portion 67 of the framework, as shown in Fig. 5. The gear 153 meshes with an idle gear 159, which in turn meshes with a gear 160 supported from the framework 66 by means of a stud 161. The gear 160 has rigidly secured to it a ratchet wheel 162, adapted to be engaged by a spring pawl 163 carried by the reciprocable rod 176, to advance the feed roll 54, and thus the record strips for each-actuation of the printing mechanism in a manner to be described. The gear 160 has also rigidly secured to it a second ratchet wheel 165, as shown in Fig. 7, adapted to be engaged by a spring pawl 166, pivoted at 167 to a disk 168, loosely mounted upon the stud 161 and free from the gear 160 and the ratchet wheels carried thereby. The ratchet wheels 162 and 165 are separated by means of a disk 169, to prevent interference between the operation of the pawls 163 and 166. The disk 168 is rigidly connected to a gear 170, meshing with an idle gear 171, which is mounted upon a stud 172, and has rigidly connected to it a gear 173. The gear 173 lies in the path of the mutilated gear 149, and when the pawl 147 is moved from the position indicated in Fig. 6 to the position indicated in Fig. 9 the gear 149, by its engagement with the gear 173, drives the feed roll 54 through the pawl 166 and ratchet wheel 165 to advance the record strips a sufficient amount so that the last impression of the printing characters is fed beyond the paper guides 55, 56 and 59 in a position to be removed from the recorder. The disk 148 carried by the shaft 104 serves to prevent rotation of the gear 173 by engaging cut-away portions therein when the gear 149 is not in engagement with such gear 173 as more clearly shown in Fig. 41.

The shaft 104 within the recorder framework is cut away at two portions, as indicated at 104ᵃ in Fig. 4, to form cam surfaces to engage the upper ends of levers 174, as shown in Fig. 11. The cam surfaces formed in the shaft 104 are indicated in dotted lines in Fig. 11, about three-quarters of the material of the shaft being cut away at these points to leave the V-shaped cam members for operating the levers 174. The levers 174 are pivotally supported at 175 within the framework of the recorder, and carry at their lower ends a rod 176 extending transversely of the recorder, which rod carries upon its right-hand end, as shown in Fig. 4, the pawl 163, above referred to, and at its left-hand end this rod has pivotally secured thereto a dog 177. A spring 178 is disposed around the rod 176 to maintain the dog 177 in engagement with a roller 179, carried by the left-hand wall of the recorder framework, as shown in Fig. 12. The dog 177 is provided at its outer end with a roller 180 adapted when the rod 176 is reciprocated by motion of the lower ends of the levers 174 to engage a lever 181, pivoted to the framework 67 at 64. The lever 181 is disposed under the left-hand end of the platen 79, as shown in Fig. 12, and when moved, by means of the dog 177, serves to raise the platen 79 against the action of its returning spring 79ᵃ. The dog 177 is provided with a cam surface 177ᵃ, adapted to engage the roller 179 when the platen 79 has been sufficiently raised, and continued motion of the rod 176 serves to move the dog 177 upward as a result of the engagement between the cam surface 177ᵃ and the roller 179 to disengage the roller 180 from the upper end of the lever 181, for which condition the spring 79ᵃ serves to forcibly return the platen 79 to make an impression of the characters upon the wheels 29, 33 and 36, which are in printing position at this time. The motion of the rod 176, caused by the levers 174, by operating the pawl 163, serves to advance the record strips the distance corresponding to one record thereon. The lower ends of the levers 174 are conformed, as indicated in Fig. 11, to engage the underside of a locking bar 183, supported by a screw 184 from a cross-bar 185 of the framework of the recorder in such a manner that it may be moved into or out of engagement with notches formed in the wheels 29, 33 and 36 between the printing characters carried by such wheels. A spring 186 serves to withdraw the locking bar 183 from engagement with the wheels 29, 33 and 36 when the levers 174 are moved to their normal position, which is accomplished by the force exerted by such spring 186 upon the lower ends of such levers when the shaft 104 is in its normal position.

Figure 21:
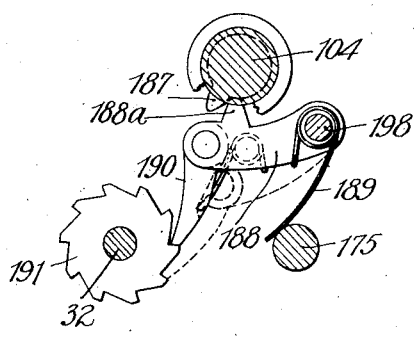
Fig. 21 is a detail view of the mechanism employed to advance the trip number one unit for each resetting of the register mechanism.

The shaft 104 carries near its right-hand end, as shown in Figs. 4 and 11, a projecting cam 187 adapted to engage a projection 188ª formed on a lever 188, which lever is normally held in engagement with the shaft 104 by a spring 189, and has pivotally secured to its left-hand end, as shown in Fig. 11, a spring pawl 190 engaging the ratchet wheel 191, carried by the units wheel 36. The detailed construction of the cam 187 and the parts actuated thereby is shown more clearly in Fig. 21.

The cam portions 104ª formed in the shaft 104 are so disposed relatively to the cam 187 and the dog 177 that by operation of the resetting handle 11 to the right the trip recording wheels 36 are first advanced one unit, then the pawl 163 advances the record strips an amount corresponding to one record, and then the platen 79 is actuated to make a record from the wheels 29, 33 and 36.

Since the shaft 104 is rotated for motion of the resetting handle 11 either to the right or to the left, it follows that a record of the wheels 29, 33 and 36 is made for either direction of motion, one surface of the cams 104ª serving to operate the levers 174 for one direction of motion of the resetting handle 11, while the other surface of such cams operates to perform a similar function for the other direction of motion of the resetting handle 11. The only difference in the operation of the mechanism for the two directions of motion of the resetting handle is that when such handle is rotated to the left the cam 187 does not operate the pawl 190, since for motion to the left of the resetting handle the shaft 104 does not make a complete rotation.

Figure 20:
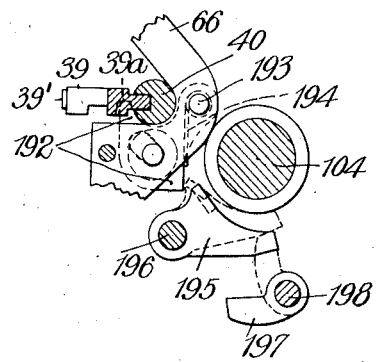
Fig. 20 is a detail view of means used for locking a latch to prevent removal of the identification key from its escutcheon when in the printing position.

A latch 192 is pivoted at 193 to the framework 66 so as to lie in the path of the conductor's identification key 39 when the latter is in its printing position, as indicated in Figs. 4 and 20. The latch 192 is beveled at its upper end so that the key 39 may be inserted in the escutcheon when the latter is in its printing position, provided the sliding bar 126 is in its upper position, and when the key 39 is thus placed in the escutcheon a spring 194 moves the latch 192 into engagement with the notch 39ª formed in the side of the key 39, as indicated in Fig. 25, and subsequent removal of the key from the escutcheon is thus prevented while the escutcheon remains in its printing position. A rocking member 195 is pivotally supported at 196 to the framework 66 in a position such that when such rocking member is moved to the position indicated in dotted lines in Fig. 20, by means of the arm 197 secured to the rod 198 by rotation of such rod, the latch 192 cannot be moved from the path of the key, and thus for this condition of the parts the key cannot be inserted into the escutcheon when the latter is in its printing position. The rod 198 has secured thereto outside of the right-hand wall of the framework 66 a second arm 199 disposed in the path of a projection 126ᶜ carried by the sliding bar 126, as a result of which when the sliding bar 126 is moved to the position indicated in Fig. 9, the rod 198 is rotated against the action of a suitable returning spring to cause the arm 197 to move the rocking member 195 into its locking position. From this it follows that if the key 39 is not properly inserted in the key escutcheon when the latter is moved to its printing position to release the resetting key that it cannot be subsequently inserted in the key escutcheon when the sliding bar 126 is in its lower position, but can only be inserted in such escutcheon when the sliding bar is in a position to permit normal operation of the registering mechanism.

As indicated in Figs. 5, 22, 23 and 24, the resetting shaft 93 has secured near its upper end a sleeve 200, which has a downwardly extending semicircular portion adapted to engage a corresponding portion formed upon a sleeve 201, into the upper end of which the lower end of the resetting shaft 93 extends. The sleeve 201 is secured to a rod 202, and between the rod 202 and the shaft 93 a spring 203 is disposed, which normally maintains the rod 202 and shaft 93 in a separated condition longitudinally, which separation is limited by the engagement of the collar 201ª formed upon the sleeve 201 with the supporting wall 204 of the resetting shaft. The formation of the sleeves 200 and 201 relatively to each other permits longitudinal motion of the sleeves, and thus of the rod 202 relatively to the shaft 93 against the action of the spring 203, to release stop mechanism provided for limiting the motion of the resetting handle 11, which is rigidly secured to the lower end of the rod 202. The rod 202 has secured thereto within the frame 204 a gear 205, which meshes with a larger gear 206 carried by a shaft 207 supported by the framework 204. The shaft 207 has loosely mounted thereon a stop dog 208 connected by a spring 209, with a disk 210 rigidly secured to the gear 206.

The operation of the resetting handle 11 is normally to the right to reset the registering mechanism and print the trip record, and after any such resetting operation the parts occupy the position indicated in Fig. 24, in which the stop 208 rests against the enlarged cylindrical portion 202ª of the rod 202 and also against a post 210ª carried by the disk 210, to which one end of the spring 209 is secured. As a result further motion to the right of the resetting shaft is prevented, since the gear 206 cannot be further rotated to the left. When it is desired to again operate the resetting handle 11 to the right it is moved upward to the position indicated in dotted lines in Fig. 22, for which position the clearance 202$^b$ is brought opposite to the stop 208, which is thereby permitted, under the influence of the spring 209, to move to the position indicated in Fig. 23, after which the rod 202 and shaft 93 may be rotated to the right until the parts again occupy the position indicated in Fig. 24. As shown in the present modification, the parts are so proportioned that the resetting handle 11 is moved through two complete rotations to effect the resetting operation, and the stop members shown in Figs. 22, 23 and 24 are so conformed as to correspondingly limit the motion of the resetting handle. The motion that may be imparted to the resetting handle to the left after the several locking mechanisms have been properly actuated to permit such motion is practically one and three-quarter rotations, the amount of this rotation being determined by the position of the pin 119 in the disk 112, and the relation of the notch 102 to the locking hook 101. It is obvious, however, that other proportions of mechanism may be used for any particular case by which different amounts of motion in either direction may be imparted to the resetting handle to operate the mechanism controlled thereby.

The operation of my recording mechanism is as follows:

When the recorder is out of service the mechanism is in a condition such that the fare registers 3 and 4 are in their zero position. The key escutcheon 88 is in its released position and the resetting handle 11 is entirely disconnected from the resetting and printing mechanism of the register and recorder. At this time the sliding bar 126 is in its upper position and the pawl 118 is in a position to move the shaft 12 to lock the register-actuating mechanism, while the pawl 110 seen in Fig. 12 has been moved around to the left, away from the notch 111. For this condition of the apparatus the hook 101 is in the notch 102 and the pin 119 is in engagement with the spring stop 120. The lever 86 at this time is in a position to release the sliding cover 60, the latch 131 is in a position to engage the escutcheon 88 when it is moved to its printing position, and the latch 139 is out of the path of the connecting plug 97; the pawl 123 is in engagement with the gear 122 and the pawl 124 is held out of engagement with such gear; the pawl 147 is in the position indicated in Fig. 9, thus preventing motion of the sliding bar 126 in a downward direction; the tumblers 134 are resting upon the periphery of the collar 135; the latch 192 is released, and the cam 187 is moved around to the right, as shown in Fig. 11, in a position to the right of the projection 188$^a$ carried by the lever 188. The record strips are supposed to have been properly threaded through the recording mechanism from the supply roll 52, as described above, so that the several thicknesses will occupy the relative positions indicated in Figs. 30 and 31 as they pass between the plates 57, 58 and the sliding cover 60—that is, the strips 52$^a$ and 52$^b$ are the ones that are coated on their rear faces as they pass upward between the plates 57 and 58 and the sliding cover 60, while the strip 52$^c$ is plain, and as a result the strip 52$^c$, which passes up between the plates 57 and 58, has its record printed upon it by means of the material carried by the back of the strip 52$^b$, while the strip 52$^b$, which passes up between the plate 52$^a$ and the sliding cover 60, has its record made upon it by means of the material coated upon the back of the strip 52$^a$. As shown in Fig. 30, the indication 52$^d$ is the trip number, the indication 52$^e$ represents the total reading of the cash recorder wheels 33, and the indication 52$^f$ represents the total reading of the transfer or ticket recording wheels 29 at the end of trip number 60. The indication 52$^g$ is the conductor's identification mark carried by the key 39, the indication 52$^h$ is the recorder number, and the indication between them the date upon which the record was made. The several indications referred to are separated upon the record strips by vertical lines 52$^k$ made upon the strips by means of the flanges 61' carried by the feed roll 61, as above described, in order that the record may be more easily read.

Figure 16:
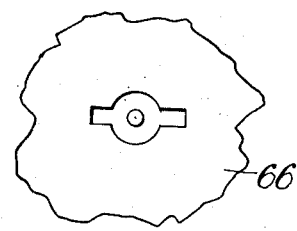
Fig. 16 is a view taken from the right of the portion of the recorder casing shown in Fig. 15.

When it is desired to operate the recorder in the normal manner the conductor, who has a connecting plug and identification key, see Figs. 27 and 25, for which he is held personally responsible, bearing corresponding identification marks, first inserts the connecting plug in the gear 95 and pushes it through such gear until the end of the plug is in engagement with the slotted member 100, see Figs. 15 and 16, carried by the right-hand end of the shaft 96. The conductor then inserts his identification key 39 into the escutcheon 88 while such escutcheon is in its released position, after which he moves the key and escutcheon to their printing position, in which position they are held by the locking member 131. For this position the latch 139 serves to retain the connecting plug 97 in position to connect the gear 95 and the shaft 96. Motion of the escutcheon 88 from its released position to its printing position removes the hook 101 from the notch 102, thus releasing the shafts 96, 104 and 108, which may be actuated by rotating the resetting handle 11 to the right. When the resetting handle has been rotated practically one and three-quarter turns to the right the lever 114 engages the notch 113, thus permitting the resetting shaft 12 to move to a position to unlock the register-actuating mechanism, and the pawl 110 is rotated around to the right, as indicated in Fig. 12, to engage the notch 111 for this position of the shaft 12. This motion of the resetting handle also serves to raise the tumblers 134 away from the key 39 and to move the pawl 147 around to the position indicated in Fig. 6. During the reversal of the pawl 147 the reduced portion of the plug 97 formed by the groove 97' occupies such a position relative to the clearance 126' formed in the bar 126 that actuation of the sliding bar during such reversal is impossible. The flat surfaces at the bottom of the groove 97', shown in Fig. 28, permit motion of the sliding bar 126 when the resetting handle is in either its register-releasing position or its extreme left-hand position. The motion imparted to the shaft 104 by the one and three-quarter turns referred to actuates the levers 174 to print the condition of the wheels 29, 33 and 36, thus beginning the new record with the reading of the trip number, total cash fares and total transfers at this time. This rotation of the shaft 104 also serves to move the cam 187 from the right of the projection 188ª around to the left of such projection without actuating the lever 188, since the direction of motion of the shaft 104 is around to the left, as indicated in Fig. 11. If the car upon which the recorder is located is to go in a direction corresponding with the direction of the trip indicator 7, the resetting handle 11 is not further operated, thus leaving the trip number the same as the last reading made on the record removed from the recorder by the preceding conductor. If, however, the car is to proceed upon a new trip or in a direction the reverse of that indicated by the trip indicator 7, the resetting handle is first moved upward to release the stop 208, after which such handle is turned two complete rotations to the right, at which time the stop 208 is operative to prevent further rotation to the right, and this motion serves to rotate the shaft 96 two rotations and the shafts 104 and 108 one rotation, thus bringing all of the parts to the same position, as described, at the end of the operation of releasing the registering mechanism by the one and three-quarter rotations to the right, above referred to. By this motion of two rotations to the right of the resetting handle, however, the trip record wheels 36 have been advanced one unit, the pawl 163 has moved the record strips along a space corresponding to one record, and the platen 79 has been again actuated by means of the levers 174, thus making a second record upon the record strips identical with the first one, with the exception that the trip number is one greater than was the first trip number. The rotation of the shaft 104 due to the two rotations to the right of the resetting handle 11 moves the pawl 147 through an entire rotation, and during this rotation the reduced portion of the plug 97 formed by the groove 97' by its engagement with the clearance 126' prevents motion of the sliding bar 126, as above described. Fares are now registered in the usual manner, and as each cash fare is registered the registers 3 and 5 are each advanced one unit, and at the same time the recording wheels 33 are similarly advanced one unit, and as each transfer or ticket is registered the indicators 4 and 6 are each advanced one unit, and at the same time the recording wheels 29 are correspondingly advanced one unit. This continues to the end of the trip, at which time the resetting handle 11 is again rotated to the right two complete turns, as above described, thus making a record of the total cash fares, the total tickets or transfers, and the next trip number. This operation is repeated until the conductor leaves the car, which may be either when the car is withdrawn from service or in the middle of a trip, without withdrawing the car from service. Assuming that the conductor leaves the car when it is withdrawn from service, it is, of course, desirable to clear the register, and this is done by first turning the resetting handle 11 to the right two complete rotations, as above described, thus making the corresponding record upon the record strips. After this the hook 129 is pulled downward, which, by the engagement of the dog 143 and the lever 144, operates the platen 74 to make a record upon the strips of the register number, the date and the conductor's identification mark. This motion of the sliding bar 126 also serves to reverse the relation of the pawls 123 and 124 relatively to the gear 122, as a result of which the pawl 124 is in engagement with such gear, while the pawl 123 is held out of engagement with the gear, as indicated in Fig. 9. This motion of the sliding bar 126 also serves to lock the latch 192, which is in engagement with the key 39, to prevent operation of such latch, although, with the key in proper position in the escutcheon 88, the locking of this latch 192 performs no function. By this motion of the sliding bar 126 the plug 97 is prevented from removal, even if the latch 139 is removed from engagement with such plug. Thus, at this time the key 39 is retained in the escutcheon 88 by the operation of the latch 192. For this relation of the apparatus the sliding bar 126 cannot be moved in an upward direction, and motion of the resetting handle 11 is possible only in a direction to the left owing to the relation of the pawls 123 and 124 relatively to the gear 122. As a result the conductor turns the resetting handle to the left one and three-quarter turns, which is as far as it will go owing to the engagement of the pin 119 with the spring stop 120, and this rotation to the left, as above described, serves to advance the record strips an amount corresponding to one record, to actuate the platen 79 to make a record of the total fares and the trip number, and also, by means of the mutilated gear 149, to feed the record strips a sufficient amount to bring the record made by the platen 74 outside of the guides 56 and 59, thus making the complete record available to the conductor. At the end of the one and three-quarter rotations to the left, when the pin 119 is brought into engagement with the stop 120 and the hook 101 is in alinement with the notch 102, the spring 40' serves to rotate the shaft 40 to carry the escutcheon 88 and the identification key 39 to their released position, since at this time the locking member 131 is in its released position, as indicated in Fig. 9, due to the position of the sliding bar 126, and the surfaces formed upon the end of the key 39 prevent the engagement of the tumblers 134 with the projections 135ª formed on the collar 135. This removes the latch 139 from the path of the connecting plug 97, which, however, is still retained in the recorder by its engagement with the sliding bar 126. Thus, since the key 39 is rotated away from the latch 192 such key may be withdrawn from the recorder by the conductor. During the one and three-quarter rotations to the left of the resetting handle 11 the pawl 147 is rotated from the position indicated in Fig. 6 to the position indicated in Fig. 9, and during this rotation the reduced portion of the plug 97 engages the sliding bar 126 in the clearance 126ª to prevent upward motion of such bar during this operation of the resetting handle. To remove the connecting plug from the recorder it is therefore necessary to move the sliding bar 126 to its upper position, which is the only operation of the mechanism that is possible, and when the sliding bar 126 is in its upper position the connecting plug may be withdrawn, and thus taken away by the conductor.

The motion of the escutcheon 88 to its released position releases the locking member 86 and permits the conductor to move the sliding cover 60 to its upper position, thus actuating the cutting-guide 59 to bring it into engagement with the two outer record strips, which he proceeds to remove as his record of the work done by him on the car. The inner record strip 52ᶜ is retained in the recorder, and as one complete record after another is made by succeeding conductors this strip passes up between the plates 57 and 58 into the tube 80, and thus into the receptacle 81, where it accumulates until removed by an inspector or auditor having a proper key to open the recorder to remove such record.

If instead of leaving the car when it is withdrawn from service the conductor is relieved for any reason during the operation of the car, and it is desired to have the same trip number continued on the succeeding conductor's record without resetting the register indicators, the sliding bar 126 is pulled down without moving the resetting handle 11 two rotations to the right to clear the register, and after this the resetting handle 11 is rotated one and three-quarters rotations to the left, as above described, the result being that the trip indicator 7 is not reversed as to direction indication, and the trip recorder wheels 36 are not advanced, the record printed at this time showing the same trip number as the last preceding record. The operation of releasing the conductor's identification key and connecting plug is, however, precisely the same as above described. When the relieving conductor makes his first record the one and three-quarter turns of the resetting key to the right serves merely to unlock the register-actuating mechanism and to print the condition of the record wheels 29, 33 and 36 without, however, changing the condition of any of these wheels or the condition of the register-indicating mechanism, as a result of which the second conductor's record begins where the preceding conductor's record ended and continues on the same trip, the two records showing that the last reading of the first conductor's record and the first portion of the second conductor's record must be used in determining the total record for that particular trip.

If for any reason the conductor, in attempting to unlock the register-actuating mechanism by manipulation of the escutcheon 88, omits to properly insert his identification key 39 in such escutcheon, it is possible to operate the register and recorder, providing the connecting plug 97 has been properly inserted to give control of the unlocking mechanism and the resetting mechanism to the resetting handle 11. The escutcheon 88 may be moved to its printing position without inserting the key 39 either before the connecting plug 97 has been placed in proper position in the gear 95 or after such plug has been so located. If the escutcheon 88 is moved to its printing position before the insertion of the connecting plug, it is retained in such position by the lock 131, but inasmuch as the resetting handle 11 is still entirely free from the resetting and unlocking mechanism the registering mechanism cannot be placed in its normal or operating condition. It is therefore necessary to insert the connecting plug, which may be done, owing to the conformation of the latch 139 carried by the escutcheon 88, and when the connecting plug is thus inserted it is held in its operative position by such latch, as above described. With the parts in this position the register may be released by means of the resetting handle 11 and actuated as described above, the only difference being that at the end of the conductor's work he has failed to insert his identification key, actuation of the resetting handle 11 one and three-quarter rotations to the left after moving the sliding bar 126 to its lower position will fail to release the escutcheon 88, since at this time the tumblers 134 are not properly supported out of the path of the projections 135$^a$ on the collar 135, and such tumblers, therefore, serve to engage the projections 135$^a$ and prevent rotation of the escutcheon 88 from its printing position to its released position, although at this time the other locking devices associated with the shaft 40 are in their releasing position. As a result it is impossible for the conductor to remove his connecting plug 97 from the recorder, and this affords a positive indication of the one who has improperly operated the machine if for any reason he leaves the same in this condition. Since the escutcheon 88 is retained substantially in its printing position, it follows that the sliding cover 60 is not released and that therefore the conductor cannot remove his record from the recorder.

If upon discovering that he cannot remove his connecting plug 97, and that therefore he has improperly operated the recording mechanism, the conductor desires to correct his error, he may do so after moving the sliding bar 126 to its upper position by moving the escutcheon 88 so that it is engaged by the lock 131, for it is to be noticed that the clearance provided between the ends of the tumblers 134 and the projections 135$^a$ on the collar 135 has permitted a slight amount of motion toward its released position of the escutcheon 88 sufficient to cause engagement between the end of the hook 101 and the notch 102. After moving the escutcheon 88 into engagement with the lock 131, the conductor may release the register-actuating mechanism as before by turning the resetting handle 11, and for any position of the resetting handle 11, which serves to place the register-actuating mechanism in its operative condition, as has already been described, the tumblers 134 are raised out of the path of the projections formed upon the end of the conductor's key 39, and such key may therefore be inserted in the escutcheon 88 at such times. After properly inserting the key 39 in the escutcheon 88 the sliding bar 126 may again be moved to its lower position, and the resetting handle 11 may be moved one and three-quarter rotations to the left, which results in printing the conductor's identification mark upon the record and subsequently releasing both the identification key and the connecting plug, as described above. It is to be noted that when the sliding bar 126 is in its lower position and the escutcheon 88 is in its printing position without having the identification key properly in place that such key cannot be inserted, which provides against the possibility of releasing the connecting plug by the insertion of the identification key after the operation of the sliding bar 126 to make a record that would normally include the conductor's identification mark. The conductor's identification key, however, may be inserted immediately before moving the sliding bar 126 to its lower position, assuming that the register-actuating mechanism has been released by means of the resetting handle 11. When the resetting handle 11 is not in a position to release the register-actuating mechanism, the tumblers 134 are in a position to prevent the insertion of the conductor's identification key to its operative position. From this it follows that if the conductor notices the incorrect condition of the apparatus after having started to use the recorder he may insert his identification key at any time before moving the sliding bar 126 to its lower position, at which time the resetting handle 11 is in a position to release the register-actuating mechanism without making an imperfect record.

Fig. 32 illustrates the operation of the recorder when a first conductor, after having used the mechanism for several trips, is relieved during a trip without resetting the register mechanism, the second conductor beginning his record where the first conductor ended, and it being necessary to consult the two records to determine the work done on the trip, which constituted, in part, the last work of the first conductor, while the remaining portion constituted the first work of the second conductor. As shown in this figure, the first conductor, in starting to use the register, made the record indicated at 211$^a$, which is identical with the record last made by the mechanism, and indicates that the first work done by the first conductor is upon trip number 60. At the end of this trip, by resetting the register mechanism by means of the resetting handle 11 the record 211$^b$ is made, which indicates that trip 60 is ended since the trip number printed in the record 211$^b$ is 61 instead of 60. This record indicates that during trip 60 the conductor has received four cash fares and no tickets or transfers. At the end of the second trip the register is again reset, and the record indicated at 211$^c$ is made, indicating that trip number 61 is ended, since the trip number now printed is 62, and the record shows that during trip number 61 two cash fares were received and eight tickets or transfers. During the trip indicated by the record 211ᵉ—that is, trip number 62, the first conductor is relieved, and in order to get his identification key and connecting plug, as a result of moving the sliding bar 126 to its downward position, the record 211ᵈ is made showing that the recorder making the record is No. 140, that the date is October 15th, and the conductor's number 710. After making the record 211ᵈ, motion of the resetting handle 11 to the left to release the mechanism to remove the identification key and connecting plug makes the record 211ᵉ, and since the trip number printed in the record 211ᵉ is the same as that printed in the record 211ᶜ, it indicates that the register has not been cleared, and that therefore trip number 62 has only been partially completed, and, further, that conductor No. 710 has taken in two cash fares and six transfers or tickets during the portion of trip number 62 that he worked. The conductor's copy of the records just referred to is now available and may be removed by him from the recorder by opening the sliding cover 60, after which the second conductor who relieves him inserts his connecting plug and identification key and makes record 211ᶠ, which, it will be noticed, is identical with record 211ᵉ, which affords an indication that the second conductor is completing the trip begun by the first conductor before he left the car. At the end of this trip record 211ᵍ is made, which indicates that the second conductor took in one cash fare and two tickets or transfers during his portion of trip number 62, and that therefore during the whole of trip number 62 three cash fares and eight tickets or transfers were taken in by the two conductors. At the end of trip number 63 it is assumed that the second conductor withdraws the car from service, and, therefore, clears the register, which serves to make the record 211ʰ, which indicates, by the advance of the trip number from 63 to 64, that trip number 63 is ended, and that three cash fares and two tickets or transfers were received during such trip. The record 211ᵏ is then made by the second conductor by moving the sliding bar 126 downward, which indicates that the second portion of the complete record is the work of conductor No. 712, the date and recorder number being the same as before. After making the record 211ᵏ, the operation of the resetting handle 11 to the left to release the second conductor's identification key and connecting plug makes the record 211ⁿ, which, by duplicating the record 211ʰ, indicates that the register mechanism has been reset, and that therefore the registering and recording mechanism are in condition to begin trip number 64.

In the modified construction shown in Figs. 33 to 38, inclusive, the resetting handle 11 is shown as directly connected with the shaft 96, and in this modification the pawls 123 and 124 are omitted, as a result of which the resetting handle may be moved at any time without the operation of any other parts from its releasing position in either direction, motion around to the right serving to reset the registering mechanism, advance the trip number and print a record of the fares registered, as above described, while motion to the left serves to release the key escutcheon, which, thereupon, moves automatically from its printing to its released position, such motion serving to release the paper-feeding mechanism employed to feed the completed record from the recorder when it is desired to have the conductor end his work. The paper-feeding operation just referred to is, in this modification, controlled by independent mechanism manually operated. The shaft 96 is connected with and drives the shafts 104 and 108 in substantially the same manner as described above, and mechanism is provided upon the left-hand side of the recorder frame for releasing the key escutcheon when the resetting key is turned to the left and for locking the registering mechanism during such motion to the left or during a resetting operation to the right in substantially the same manner as described above.

Figure 35:
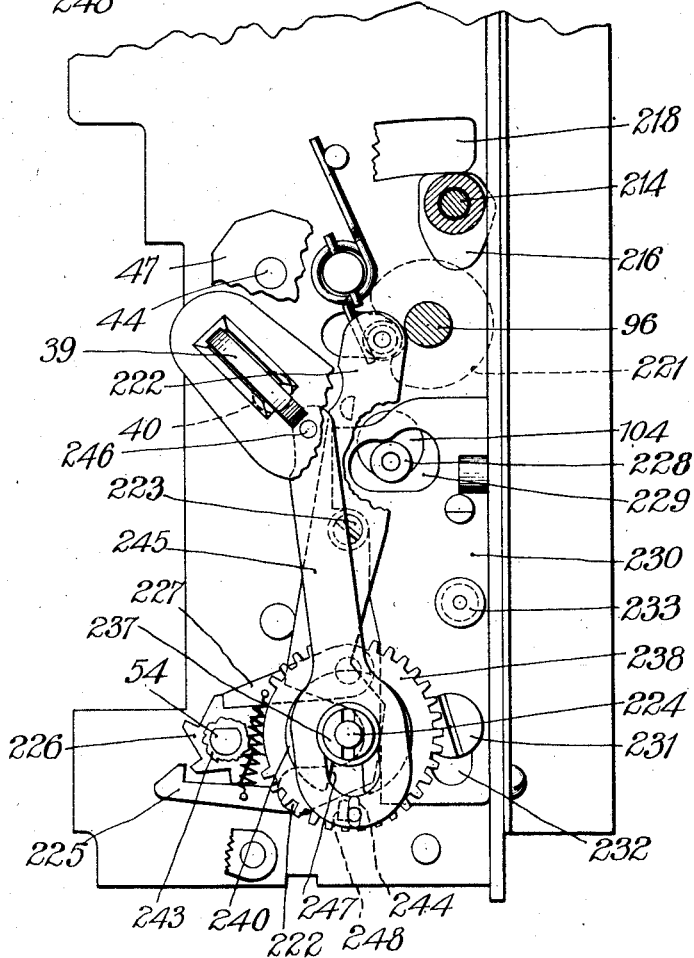
Fig. 35 is a view similar to Fig. 34 showing the identification key in its released position.

As shown in Figs. 33, 34 and 35, the shaft 96 has secured to its right-hand end a pinion 212 meshing with a gear 213 mounted upon a stud 214 secured to the right-hand side of the recorder frame 66. The stud 214 carries a sleeve loosely supporting the gear 213, such sleeve having formed upon its outer end a cam 215 and upon its inner end a cam 216. The gear 213 has pivoted thereto a spring pawl 217 adapted to engage the cam 215 for motion of such gear to the right, while motion of such gear to the left does not engage the cam 215 to rotate it, as a result of which rotation of the cam 216 does not take place for motion to the left of the gear 213, and the parts adapted to be actuated by the cam 216, therefore, remain unoperated at this time. The cam 216 has bearing upon it a lever arm 218 secured to the shaft 219 pivotally supported in the portion 67 of the framework, which shaft by its operation is adapted to actuate the platen 220, shown in Fig. 36, in a manner to be described. The shaft 96 has secured to it inside of the side wall of the framework 66 a cam 221 adapted to operate the upper end of a lever 222 pivoted to the framework of the recorder at 223. The lower end of the lever 223 is conformed to encircle a stud 224 extending to the right from the recorder casing 66, and to the lower end of the lever 222 a spring pawl 225 is pivoted in such a manner as to actuate the feed-roll 54 by means of a ratchet wheel 226 secured to the right-hand end of such roll. A spring pawl 227 is provided to retain the feed-roll 54 in the position to which it is moved.

The shaft 104 has extending from its right-hand end an eccentrically disposed roller 228 adapted to engage an opening 229 in an operating plate 230 supported adjacent to the right-hand wall of the casing 66 in a manner to reciprocate vertically when actuated by the roller 228 by rotation of the shaft 104. The plate 230 is secured in this position by a screw 231 extending through a slot 232, and this plate has mounted upon it a roller 233 adapted to engage the inner end of a lever 234 secured to a shaft 235 to operate the platen 236, shown in Fig. 36, in a manner to be described.

Figure 38:
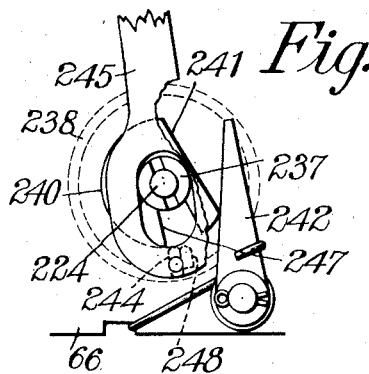
Fig. 38 is a detail view of a portion of the paper-feeding mechanism.

The stud 224 has mounted thereon a sleeve 237, to the inner end of which a mutilated gear 238 is secured, the outer end of such sleeve being provided with an operating handle 239 for rotating the gear. The gear 238 has secured thereto on its outer face a disk 240 having a flattened face 241, as indicated in Fig. 38, adapted to be engaged by a spring lever 242, which serves to normally hold the gear 238 and the operating handle 239 in a position such that the cutaway portion of the gear 238 is opposite the pinion 243 secured to the right-hand end of the shaft 54 with which the gear 238 is adapted to mesh. Motion of the gear 238 and the disk 240 from this position, which is indicated in Fig. 34, is normally prevented by means of a lock 244 carried by the lower end of the bar 245, the upper end of which is pivotally secured at 246 to the key escutcheon 88, which escutcheon, as described above, is secured to the right-hand end of the shaft 40. The lock 244 to prevent rotation of the gear 238 and disk 240 normally rests in a notch 247 formed in the disk 240, as a result of which it is necessary for the key escutcheon 88 to be released by actuation of the resetting handle 11 to the left before the feeding handle 239 can be rotated to drive the feed-roll 54. When the resetting handle 11 has been thus rotated to release the escutcheon 88, the bar 245 moves to its downward position, for which position the lock 244 is moved out of the notch 247 immediately back of a lug 248 carried by the side of the gear 238. This relation of parts provides that the handle 239 may now be rotated, so that the gear 238 is rotated to the right, as shown in Fig. 34, which serves to advance the feed-roll 54 a sufficient amount to move the completed record from the recorder so that it is available to the conductor. This motion is limited by the lug 248 engaging the lock 244, and further motion of the feeding handle 239 is prevented until the escutcheon 88 is again moved to its printing position. When the lug 248 engages the lock 244, as described, the flat face 241 formed on the disk 240 is in substantially the position indicated in Fig. 38, and when the lock 244 is moved out of the path of the lug 248, as indicated in Fig. 34, by motion of the escutcheon 88 to its printing position, the lever 242 serves to move the gear 238 to the position indicated in Fig. 34, so that when the lock 244 is again moved to its downward position by the release of the escutcheon 88 the feeding handle 239 may be again actuated through practically a complete rotation. From the construction above described it follows that the feeding handle 239 serves to deliver a completed record from the recorder, while the pawl 225, actuated by each resetting operation, serves to advance the record strips an amount corresponding to an individual record for each rotation of the shaft 96. If the completed records are not removed from the recorder as made, they are received by a curved guide 248' at the upper end of the recorder and directed by such guide into a receiving tube 249 located at the back of the recording framework 66.

As shown in Figs. 36 and 37, the shaft 219 has rigidly secured to it two lever arms 250, secured together at their lower ends by a rod 251 adapted to press upon the outer surface of the platen 220, which is held in engagement with such rod by the spring 252. The platen 220 is supported in this position by engagement of its ends with grooves 253 formed in the side walls of the portion 67 of the framework. As shown in Fig. 37, the platen 220 is provided with a plurality of individual bearing clips 254 of steel or similar material, one of which is provided for each character to be printed, and these several clips are separated from the platen 20 by means of a strip of resilient material 255, which may be of any suitable substance, as rubber, of a proper degree of hardness. The clips 254 are bent, as indicated in Fig. 36, so as to be retained in yielding engagement with the platen 220.

As a result of the construction described, when the lever 218 is actuated by the cam 216 the shaft 219 is rotated and the clips 254 are pressed forcibly into engagement with the various characters to be printed, thus making a record of such characters upon the record strips. The platen 236 is supported from the shaft 235, and operates in the same manner by means of the lever 234 as does the platen 220 when the lever 218 is actuated.

The construction of fare recorder shown in the present application is similar to that shown in a co-pending companion application, and since all of the features shown in such construction do not form a part of my present invention it is to be understood that such features of construction are claimed in the co-pending application referred to.

Many modifications of the particular arrangements herein disclosed may obviously be employed for accomplishing the purposes set forth, and I do not, therefore, limit myself to the forms of mechanism herein employed for accomplishing my invention.

What I claim is:

1. In a fare recorder, the combination of recording means having relatively stationary character wheels adapted to print a record of the fares collected and other changeable recording means in line with but in advance of said first mechanism for recording the conductor's identification, a first device for operating the fare recording mechanism and a second operating device for operating the identification recording mechanism, interlocking means to prevent one of said operating devices from being actuated while the other is being actuated and means for compelling operation of said fare recording mechanism before said conductor's identification recording mechanism can be operated.

2. In a fare recorder, a recording surface adapted to receive a record, means for feeding said record surface forward, a recording device adapted to make consecutive records upon said surface, manual means for operating the feeding means and the recording means, said feeding means comprising a pair of delivery rolls, a second recording device placed in line with and ahead of said first recording device with respect to the movement of said surface, a second manual means for operating said second recording device and for thereafter advancing the record surface a distance sufficient to bring said indication past said delivery rolls.

3. In a fare recorder, a recording surface adapted to receive a record, means for feeding said record surface forward, a recording device adapted to make consecutive records upon said surface, manual means for operating the feeding means and the recording means, said feeding means comprising a pair of delivery rolls, a second recording device placed in line with and ahead of said first recording device with respect to the movement of said surface, a second manual means for operating said second recording device and for thereafter advancing the record surface a distance sufficient to bring said indication past said delivery rolls, and interlocking means for each of said operating means to prevent the operation of the other.

4. In a fare recorder, a recording surface adapted to receive a record, means for feeding said record surface forward, a recording device adapted to make consecutive records upon said surface, manual means for operating the feeding means and the recording means, said feeding means comprising a pair of delivery rolls, a second recording device placed in line with and ahead of said first recording device with respect to the movement of said surface, a second manual means for operating said second recording device and for thereafter advancing the record surface a distance sufficient to bring said indication past said delivery rolls and means for invariably compelling actuation of said first operating means before said second operating means can be actuated.

5. In a fare recorder, the combination of two recording devices, one of said devices comprising relatively stationary character wheels adapted to be advanced in accordance with the fares collected, the other of said devices comprising relatively stationary changeable character devices adapted to contain identifying characters relating to the fares indicated on said character wheels, a record strip, means for making a record upon said record strip of the characters on said first device, other means for making a record on said strip of the characters on said second device and means to prevent one of said recording means from being operated while the other is being operated.

6. In a fare recorder, the combination of two recording devices, one of said devices comprising relatively stationary character wheels adapted to be advanced in accordance with the fares collected, the other of said devices comprising relatively stationary changeable character devices adapted to contain identifying characters relating to the fares indicated on said character wheels, a record strip, means for making a record upon said record strip of the characters on said first device, other means for making a record on said strip of the characters on said second device and means to prevent one of said recording means from being operated while the other is being operated, and means to compel operation of said first recording means before said second recording means can be operated.

7. In a fare recorder, the combination of recording mechanism, registering mechanism, and resetting mechanism adapted for one direction of motion to reset the registering mechanism and actuate the recording mechanism and for a second direction of motion to actuate the recording mechanism.

8. In a fare recorder, the combination of registering mechanism, and resetting mechanism adapted to motion in two directions, motion in one direction serving to reset the registering mechanism and motion in either direction serving to make a record.

9. In a fare recorder, the combination of fare registering mechanism, recording mechanism, a resetting shaft rotatable in either direction, motion in one direction of such shaft serving to reset the registering mechanism and motion in either direction serving to actuate the recording mechanism to make a record of the fares registered.

10. In a fare recorder, the combination of trip recording mechanism, and an actuating member for the recorder operable in two directions, operation of such member in one direction serving to advance the trip recording mechanism and operation of such member in the other direction serving to actuate the recording mechanism.

11. In a fare recorder, the combination of trip recording mechanism, and an actuating member operable in either of two directions to make a record from such mechanism, operation of such member in one direction serving to advance such mechanism.

12. In a fare recorder, the combination of trip registering mechanism, fare registering mechanism, recording mechanism, trip recording mechanism, and a resetting member capable of motion in two directions, motion of such member in one direction serving to actuate the recording mechanism and motion in the other direction serving to reset the registering mechanism and advance the trip recording mechanism.

13. In a fare recorder, the combination of trip recording mechanism, fare registering mechanism, a resetting shaft, and devices associated with such shaft for advancing the trip recording mechanism, making a record from such mechanism and resetting the registering mechanism for one direction of rotation of the shaft and for making a record from the trip recording mechanism for the other direction of rotation of the shaft.

14. In a fare recorder, the combination of trip recording mechanism, fare recording mechanism, fare registering mechanism, a resetting shaft rotatable in either direction to operate the trip and fare recording mechanisms, and devices associated with such shaft for advancing the trip recording mechanism and resetting the fare registering mechanism for rotation of the shaft in a first direction, rotation of the shaft in such first direction to its initial position after such shaft has been rotated in the other direction serving only to operate the trip and fare recording mechanisms.

15. In a fare recorder, the combination of registering mechanism, locking mechanism for the registering mechanism, and a member operable different amounts in two directions to actuate the locking mechanism, a complete operation in one direction serving to leave the registering mechanism in released condition and a complete operation in the other direction serving to leave the registering mechanism in locked condition.

16. In a fare recorder, the combination of registering mechanism, locking mechanism for the registering mechanism, a resetting shaft rotatable a different amount in one direction from the other direction, and devices operative during rotation in one direction to actuate the locking mechanism and release the same at the end of the operation and operative during rotation in the other direction to actuate such locking mechanism and retain it in locked condition at the end of the operation.

17. In a fare recorder, the combination of registering mechanism, locking mechanism for the registering mechanism, a resetting shaft rotatable different amounts in the two directions to actuate the locking mechanism, motion in one direction through a complete operation leaving the shaft in a locking position.

18. In a fare recorder, the combination of registering mechanism, locking mechanism for the registering mechanism, a resetting shaft rotatable in both directions to actuate the locking mechanism, a stop for limiting rotation of the shaft in one direction when it reaches its releasing position, and a second stop for limiting rotation of the shaft in the other direction while in a locking position.

19. In a fare recorder, the combination of registering mechanism, an identification key escutcheon, and a member operable in two directions, a complete operation of such member in one direction adapted to lock the escutcheon in operative position and release the registering mechanism and a complete operation of such member in the other direction adapted to release the escutcheon and lock the registering mechanism.

20. In a fare recorder, the combination of registering mechanism, locking mechanism for the registering mechanism, an identification key escutcheon having printing and released positions, a resetting shaft rotatable in both directions to actuate the locking mechanism, a stop for limiting rotation of the shaft in a first direction when it reaches a position releasing the locking mechanism and locking the escutcheon in printing position, and a second stop for permitting less rotation of the shaft in a second direction to lock the registering mechanism and release the escutcheon.

21. In a fare recorder, the combination of a key escutcheon, an identification key, and means for preventing displacement of the escutcheon to its released position when the key is not in such escutcheon.

22. In a fare recorder, the combination of a key escutcheon having printing and released positions, an identification key, and a latch for preventing motion of the escutcheon to its released position when the key is not in place in the escutcheon.

23. In a fare recorder, the combination of a key escutcheon having printing and released positions, an identification key, and a tumbler for engaging the escutcheon to prevent motion of the escutcheon to its released position when the key is not in the escutcheon, such key when in the escutcheon preventing engagement between the tumbler and escutcheon.

24. In a fare recorder, the combination of a key escutcheon having printing and released positions, an identification key, and a spring tumbler for engaging the escutcheon to prevent motion of the escutcheon to its released position when the key is not in the escutcheon, the end of the key so conformed as to engage and support the tumbler out of the path of the escutcheon when the key is in the escutcheon.

25. In a fare recorder, the combination of recording mechanism, a pair of record strips, one of said strips having a transfer surface, a first feeding roller, a coöperating feeding roller having flanges thereon adapted to mark the record to divide such record into a plurality of portions, means for positively rotating said first feeding roller to advance said strip and spring means to press said second roller against said strips.

26. In a fare recorder, the combination of recording mechanism, a record strip, a feeding roller, and a pressure device engaging the roller nearer one end than the other.

27. In a fare recorder, the combination of recording mechanism, a record strip, a feeding roller, and pressure mechanism for exerting a greater thrust upon one end of the roller than upon its other end.

28. In a fare recorder, the combination of recording mechanism, a record strip, a feeding roller driven from one end, and spring mechanism for exerting a greater pressure upon the record strip at the driven end of the roller than at its other end to compensate for the thrust of the roller driving device.

29. In a fare recorder, the combination of recording mechanism, a record strip, feeding rollers for such strip, gearing between the rollers at one end, and spring mechanism exerting a greater pressure between the rollers at the gearing end than at the other end to compensate for the thrust of the gearing.

30. In a fare recorder, the combination of recording devices, a record strip, a movable bar, a platen supported when not making a record by the bar out of engagement with such strip and movable relatively to such bar, springs for supporting the platen from the bar and a facing of resilient material on such platen, means for moving the bar away from its normal position, and spring means for forcibly returning the bar to its normal position.

31. In a fare recorder, the combination of recording devices, a record strip, a movable bar, a platen supported when not making a record by the bar out of engagement with such strip and movable relatively to such bar, springs for supporting the platen from the bar and a facing of resilient material on such platen, mechanism for moving the bar away from the record strip, devices for disengaging the bar from such moving mechanism, and a spring for returning the bar to its normal position.

32. In a fare recorder, the combination of recording devices, record receiving means, a movable bar, a rigid platen member movably supported by the bar, a yielding facing for such member, means for moving the platen away from its normal position, and spring means for forcibly returning the platen to its normal position.

33. In a fare recorder, the combination of recording devices, record receiving means, a movable bar, a rigid platen member movably supported by the bar, a yielding facing for such member, mechanism for moving the platen away from the record strip, devices for disengaging the platen from such moving mechanism, and a spring for returning the platen to its normal position.

34. In a fare recorder, the combination of recording mechanism, registering mechanism, resetting mechanism adapted to actuate one portion only of the recording mechanism, an independent printing member for actuating another portion of the recording mechanism, and means for invariably compelling the actuation of said first portion of the recording mechanism first.

35. In a fare recorder, the combination of mechanism for registering fares collected, a first recording mechanism for making a record of the said fares, actuating means therefor, a type bar carrying the recorder number, a device for receiving a conductor's identification type mark, a second recording mechanism for making a record from said type bar and said type mark and independent actuating means therefor.

36. In a fare recorder, the combination of mechanism for registering fares collected, a first recording mechanism for making a record of the said fares, a type bar carrying the recorder number, a device for receiving a conductor's identification type mark, a second recording mechanism for making a record from said type bar and said type mark, and a separate actuating device for each recording mechanism.

37. In a fare recorder, the combination of mechanism for registering fares collected, a first recording mechanism for making a record of the said fares, a device for receiving a conductor's identification type mark, a second recording mechanism for making a record from said type mark and independent manually-controlled means for actuating the recording devices.

38. In a fare recorder, the combination of registering mechanism, means for recording the readings of the registering mechanism, means for recording the identification of the conductor operating the recorder, a first member adapted to actuate the register recording means when operated in either of two directions, and a second member for actuating the identification recording means.

39. In a fare recorder, the combination of registering mechanism, means for recording the readings of the registering mechanism, register resetting mechanism adapted to actuate the register recording means, identification recording means, and a member independently operable for actuating the identification recording means.

40. In a fare recorder, the combination of registering mechanism, means for recording the readings of the registering mechanism, a register resetting shaft adapted when rotated in either direction to actuate the register recording means, identification recording means, and a sliding bar independently operable for actuating the identification recording means.

41. In a fare recorder, the combination of recording mechanism, an escutcheon for holding a conductor's identification key, and a member for printing an identification record from a key in said escutcheon separately from the operation of the recording mechanism.

42. In a fare recorder, the combination of fare recording mechanism, an escutcheon for holding a conductor's identification key, and a sliding bar and printing means operable independently of the fare recording mechanism for printing an identification record from a key in said escutcheon.

43. In a fare recorder, the combination of resetting mechanism capable of motion in two directions and operable during intervals of advance of the recorder in one direction only, and a printing member adapted by its operation to permit motion of the resetting mechanism in the other direction.

44. In a fare recorder, the combination of actuating mechanism capable of motion in two directions and operable during intervals of advance of the recorder in one direction only, and a printing member adapted by its operation to permit motion of the actuating mechanism in the other direction and to prevent motion of such mechanism in the first direction.

45. In a fare recorder, the combination of recording mechanism, actuating mechanism capable of motion in two directions and operable during intervals of advance of the recording mechanism in one direction only, and an independent printing member adapted by its operation to permit motion of the actuating mechanism in the other direction.

46. In a fare recorder, the combination of recording mechanism, actuating mechanism capable of motion in two directions and operable during intervals of advance of the recording mechanism in one direction only, and an independent printing member adapted by its operation to permit motion of the actuating mechanism in the other direction and to prevent motion of such mechanism in the first direction.

47. In a fare recorder, the combination of registering mechanism, means for recording the readings of the registering mechanism, means for recording the identification of the conductor operating the recorder, a first actuating mechanism capable of motion in two directions to operate the register recording means and operable during intervals of advance of the recording mechanism in one direction only, and an independent actuating mechanism for the identification recording means adapted when operated to permit motion of the first actuating mechanism in its other direction.

48. In a fare recorder, the combination of registering mechanism, means for recording the readings of the registering mechanism, means for recording the identification of the conductor operating the recorder, a first actuating mechanism capable of motion in two directions to operate the register recording means and operable during intervals of advance of the recording mechanism in one direction only, and an independent actuating mechanism for the identification recording means adapted when operated to permit motion of the first actuating mechanism in its other direction and to prevent motion of such first actuating mechanism in the first direction.

49. In a fare recorder, the combination of registering mechanism, means for recording the readings of the registering mechanism, means for recording the identification of the conductor operating the recorder, a first actuating mechanism capable of motion in two directions to operate the register recording means, and an independent actuating mechanism for the identification recording means adapted by its position to determine the direction of motion of the first actuating mechanism.

50. In a fare recorder, the combination of recording mechanism, a first actuating mechanism normally operable in one direction only, a key escutcheon having printing and released positions, and a second actuating mechanism adapted by its operation to permit motion of the first actuating mechanism only in a second direction to release such escutcheon.

51. In a fare recorder, the combination of registering mechanism, means for recording the readings of the registering mechanism, an identification key escutcheon having printing and released positions, register resetting mechanism capable of actuation in two directions to operate the register recording means, locking mechanism controlled by the resetting mechanism for maintaining the escutcheon in its printing position, and a member independently operable for recording the identification mark on the key, such member when in its operated position serving to permit motion of the resetting mechanism only in a direction to release the locking mechanism.

52. In a fare recorder, the combination of registering mechanism, means for recording the readings of the registering mechanism, a register resetting shaft adapted to operate the register recording means when actuated in either direction, devices for permitting motion of the shaft during periods of advance of the recording mechanism in a first direction only, an identification key escutcheon having printing and released positions, a lock for maintaining the escutcheon in its printing position for motion of the resetting shaft in such first direction, and a sliding bar for making a record of the identification key, such bar when in its operated position serving to move such devices to permit motion of the resetting shaft only in a second direction to release such lock.

53. In a fare recorder, the combination of a resetting shaft, two pawls adapted to alternately engage such shaft to determine its direction of motion, and a printing member adapted by its position to determine the pawl that is in operative position.

54. In a fare recorder, the combination of a resetting shaft capable of motion in two directions, two pawls adapted to alternately engage such shaft to determine its direction of motion, and a sliding bar engaging such pawls to cause a desired one to occupy its operative position.

55. In a fare recorder, the combination of a resetting shaft capable of motion in two directions, two pawls adapted to alternately engage such shaft to determine its direction of motion, and a sliding bar engaging such pawls to cause a desired one to occupy its operative position and to move the other pawl to its inoperative position.

56. In a fare recorder, the combination of registering mechanism, means for recording the readings of the registering mechanism, a register resetting shaft adapted to operate the register recording means when actuated in either direction, a first pawl for permitting rotation of the shaft in only a first direction, a second pawl for permitting rotation of the shaft only in a second direction, an identification key escutcheon having printing and released positions, a lock for maintaining the escutcheon in its printing position for rotation of the shaft in the first direction, and a sliding bar for making a record from the identification key, such bar when in its operated position serving to remove the first pawl and bring into operative position the second pawl to permit motion of the shaft in a direction to release such lock.

57. In a fare recorder, the combination of registering mechanism, means for recording the readings of the registering mechanism, a register resetting shaft adapted to operate the register recording means when actuated in either direction, a first pawl for permitting rotation of the shaft in only a first direction, a second pawl for permitting rotation of the shaft only in a second direction, an identification key escutcheon having printing and released positions, a lock for maintaining the escutcheon in its printing position for rotation of the shaft in the first direction, and a sliding bar for making a record from the identification key, such bar when in its operated position serving to remove the first pawl and bring into operative position the second pawl to permit motion of the shaft in a direction to release such lock, motion of such bar to its normal position serving to remove the second pawl and again bring into operative position the first pawl.

58. In a fare recorder, the combination of a key escutcheon having printing and released positions, and a tumbler having two positions operative to retain the escutcheon in its printing position.

59. In a fare recorder, the combination of a key escutcheon having printing and released positions, and a tumbler having two positions operative to retain the escutcheon in its printing position, such tumbler adapted to be held in an inoperative position by a proper key in the escutcheon.

60. In a fare recorder, the combination of a key escutcheon having printing and released positions, and a tumbler having two positions operative to retain the escutcheon in its printing position, such tumbler serving in one of its positions to prevent insertion of a key into the escutcheon.

61. In a fare recorder, the combination of a key escutcheon having printing and released positions, and a plurality of independent tumblers each having two operative positions to engage the escutcheon, such tumblers adapted to be held in an inoperative position by a proper key in the escutcheon and serving when in one operative position to prevent insertion of a key into the escutcheon.

62. In a fare recorder, the combination of registering mechanism, resetting mechanism, an identification key escutcheon having printing and released positions and a tumbler having two operative positions to prevent motion of the escutcheon, motion of the resetting mechanism serving to move the tumbler from one of such positions to the other.

63. In a fare recorder, the combination of registering mechanism, resetting mechanism, an identification key escutcheon having printing and released positions, independent tumblers each having two operative positions to retain the escutcheon in printing position, and devices controlled by the resetting mechanism for moving the tumblers to one operative position during a resetting operation and to the other operative position at the end of such operation, such tumblers adapted to be held in an inoperative position by a proper key in the escutcheon and serving when in one operative position to prevent insertion of a key into the escutcheon.

64. In a fare recorder, the combination of recording mechanism, registering mechanism, a resetting shaft rotatable in either direction to actuate the recording mechanism, rotation of such shaft in one direction serving to reset the registering mechanism, a stop adapted to repeatedly limit rotation of the shaft in the same direction for successive resetting operations and means for moving the resetting shaft from engagement with the stop.

65. In a fare recorder, the combination of recording mechanism adapted to print a record in two parts, registering mechanism, resetting mechanism adapted for one direction of motion to reset the registering mechanism and actuate one portion of the recording mechanism and for a second direction of motion to actuate the same portion of the recording mechanism, and independent mechanism for actuating the other portion of the recording mechanism.

66. In a fare recorder, the combination of fare registering mechanism, mechanism for recording the fares and trip number, independent mechanism for recording the conductor's identification, recorder number and the date, a resetting shaft rotatable in either direction, motion in one direction of such shaft serving to reset the registering mechanism and motion in either direction serving to make a record of the fares registered and the trip number, and an independent device for actuating the mechanism for recording the conductor's identification, recorder number and the date.

67. In a fare recorder, the combination of recording mechanism adapted to print a record in two parts, registering mechanism, resetting mechanism adapted for one direction of motion to reset the registering mechanism and actuate one portion of the recording mechanism and for a second direction of motion to actuate the same portion of the recording mechanism, independent mechanism for actuating the other portion of the recording mechanism, and trip recording mechanism, motion of the resetting mechanism in one direction serving to advance the trip recording mechanism.

68. In a fare recorder, the combination of fare registering mechanism, mechanism for recording the fares and trip number, independent mechanism for recording the conductor's identification, recorder number and the date, a resetting shaft rotatable in either direction, motion in one direction of such shaft serving to reset the registering mechanism and motion in either direction serving to make a record of the fares registered and the trip number, an independent device for actuating the mechanism for recording the conductor's identification, recorder number and the date, and devices associated with such shaft for advancing the trip recording mechanism for rotation of the shaft in a resetting direction, rotation of the shaft in such resetting direction to its initial position after such shaft has been rotated in the other direction serving only to operate the trip and fare recording mechanisms.

69. In a fare recorder, the combination of recording mechanism adapted to print a record in two parts, registering mechanism, resetting mechanism adapted for one direction of motion to reset the registering mechanism and actuate one portion of the recording mechanism and for a second direction of motion to actuate the same portion of the recording mechanism, independent mechanism for actuating the other portion of the recording mechanism, trip recording mechanism, motion of the resetting mechanism in one direction serving to advance the trip recording mechanism, and means for positively holding the recording mechanism in position during a recording operation.

70. In a fare recorder, the combination of fare registering mechanism, mechanism for recording the fares and trip number, independent mechanism for recording the conductor's identification, recorder number and the date, a resetting shaft rotatable in either direction, motion in one direction of such shaft serving to reset the registering mechanism and motion in either direction serving to make a record of the fares registered and the trip number, an independent device for actuating the mechanism for recording the conductor's identification, recorder number and the date, devices associated with such shaft for advancing the trip recording mechanism for rotation of the shaft in a resetting direction, rotation of the shaft in such resetting direction to its initial position after such shaft has been rotated in the other direction serving only to operate the trip and fare recording mechanisms, a record strip, a locking member, and mechanism for moving such member into alined notches in the recording mechanisms and for bringing the strip against the portions of the recording mechanisms thus held in printing position.

71. In a fare recorder, the combination of recording mechanism adapted to print a record in two parts, registering mechanism, resetting mechanism adapted for one direction of motion to reset the registering mechanism and actuate one portion of the recording mechanism and for a second direction of motion to actuate the same portion of the recording mechanism, independent mechanism for actuating the other portion of the recording mechanism, trip recording mechanism, motion of the resetting mechanism in one direction serving to advance the trip recording mechanism, record receiving means, and a rigid platen having a yielding facing for forcing the record receiving means against the recording mechanism.

72. In a fare recorder, the combination of fare registering mechanism, mechanism for recording the fares and trip number, independent mechanism for recording the conductor's identification, recorder number and the date, a resetting shaft rotatable in either direction, motion in one direction of such shaft serving to reset the registering mechanism and motion in either direction serving to make a record of the fares registered and the trip number, an independent device for actuating the mechanism for recording the conductors's identification, recorder number and the date, devices associated with such shaft for advancing the trip recording mechanism for rotation of the shaft in a resetting direction, rotation of the shaft in such resetting direction to its initial position after such shaft has been rotated in the other direction serving only to operate the trip and fare recording mechanisms, a record strip, a platen normally disposed out of engagement with such strip, such platen comprising a rigid frame, a bar supported by springs from such frame and a facing of resilient material on such bar, mechanism for moving the platen away from the record strip, devices for disengaging the platen from such moving mechanism, and a spring for returning the platen to its normal position.

73. In a fare recorder, the combination of recording mechanism adapted to print a record in two parts, registering mechanism, resetting mechanism adapted for one direction of motion to reset the registering mechanism and actuate one portion of the recording mechanism and for a second direction of motion to actuate the same portion of the recording mechanism, independent mechanism for actuating the other portion of the recording mechanism, and trip recording mechanism, motion of the resetting mechanism in one direction serving to advance the trip recording mechanism, such resetting mechanism operable during periods of advance of the recording mechanism in one direction only and controlled as to the direction of its operation by such independent mechanism.

74. In a fare recorder, the combination of fare registering mechanism, mechanism for recording the fares and trip number, independent mechanism for recording the conductor's identification, recorder number and the date, a resetting shaft rotatable in either direction, motion in one direction of such shaft serving to reset the registering mechanism and motion in either direction serving to make a record of the fares registered and the trip number, an independent device for actuating the mechanism for recording the conductor's identification, recorder number and the date, devices associated with such shaft for advancing the trip recording mechanism for rotation of the shaft in a resetting direction, rotation of the shaft in such resetting direction to its initial position after such shaft has been rotated in the other direction serving only to operate the trip and fare recording mechanisms, devices for permitting motion of the shaft during periods of advance of the recording mechanism in a first direction only, an identification key escutcheon having printing and released positions, a lock for maintaining the escutcheon in its printing position for motion of the resetting shaft in such first direction, such independent device when in its operated position serving to move such resetting shaft controlling devices to permit motion of the resetting shaft only in a second direction to release such lock.

75. In a fare recorder, the combination of recording mechanism adapted to print a record in two parts, registering mechanism, resetting mechanism adapted for one direction of motion to reset the registering mechanism and actuate one portion of the recording mechanism and for a second direction of motion to actuate the same portion of the recording mechanism, independent mechanism for actuating the other portion of the recording mechanism, trip recording mechanism, motion of the resetting mechanism in one direction serving to advance the trip recording mechanism, and two pawls adapted to alternately engage such resetting mechanism to determine its direction of motion, the position of such independent mechanism determining the pawl that is in operative position.

76. In a fare recorder, the combination of fare registering mechanism, mechanism for recording the fares and trip number, independent mechanism for recording the conductor's identification, recorder number and the date, a resetting shaft rotatable in either direction, motion in one direction of such shaft serving to reset the registering mechanism and motion in either direction serving to make a record of the fares registered and the trip number, an independent device for actuating the mechanism for recording the conductor's identification, recorder number and the date, devices associated with such shaft for advancing the trip recording mechanism for rotation of the shaft in a resetting direction, rotation of the shaft in such resetting direction to its initial position after such shaft has been rotated in the other direction serving only to operate the trip and fare recording mechanisms, a first pawl for permitting rotation of the shaft in only a first direction, a second pawl for permitting rotation of the shaft only in a second direction, an identification key escutcheon having printing and released positions, and a lock for maintaining the escutcheon in its printing position for rotation of the shaft in the first direction, such independent device when in its operated position serving to remove the first pawl and to bring into operative position the second pawl to permit motion of the shaft in a direction to release such lock, motion of such independent device to its initial position serving to remove the second pawl and again bring into operative position the first pawl.

77. In a fare recorder, the combination of recording mechanism adapted to print a record in two parts, registering mechanism, resetting mechanism adapted for one direction of motion to reset the registering mechanism and actuate one portion of the recording mechanism and for a second direction of motion to actuate the same portion of the recording mechanism, independent mechanism for actuating the other portion of the recording mechanism, a key escutcheon having printing and released positions, a tumbler having two positions operative to retain the escutcheon in its printing position, a stop for preventing motion of one of such actuating mechanisms after one complete operation, and means for moving such actuating mechanism from engagement with the stop.

78. In a fare recorder, the combination of fare registering mechanism, mechanism for recording the fares and trip number, independent mechanism for recording the conductor's identification, recorder number and the date, a resetting shaft rotatable in either direction, motion in one direction of such shaft serving to reset the registering mechanism and motion in either direction serving to make a record of the fares registered and the trip number, an independent device for actuating the mechanism for recording the conductor's identification, recorder number and the date, an identification key escutcheon having printing and released positions, independent tumblers each having two operative positions to retain the escutcheon in printing position, devices controlled by the resetting shaft for moving the tumblers to one operative position during a resetting operation and to the other operative position at the end of such operation, such tumblers adapted to be held in an inoperative position by a proper key in the escutcheon and serving when in one operative position to prevent insertion of a key into the escutcheon, and a removable stop adapted to repeatedly limit rotation of the shaft in the same direction for successive resetting operations.

79. In a fare recorder, the combination of recording mechanism adapted to print a record in two parts, registering mechanism, resetting mechanism adapted for one direction of motion to reset the registering mechanism and actuate one portion of the recording mechanism and for a second direction of motion to actuate the same portion of the recording mechanism, independent mechanism for actuating the other portion of the recording mechanism, locking mechanism for the registering mechanism, and a member operable different amounts in two directions to actuate the locking mechanism, a complete operation in one direction serving to leave the registering mechanism in released condition and a complete operation in the other direction serving to leave the registering mechanism in a locked condition.

80. In a fare recorder, the combination of fare registering mechanism, mechanism for recording the fares and trip number, independent mechanism for recording the conductor's identification, recorder number and the date, a resetting shaft rotatable in either direction, motion in one direction of such shaft serving to reset the registering mechanism and motion in either direction serving to make a record of the fares registered and the trip number, an independent device for actuating the mechanism for recording the conductor's identification, recorder number and the date, locking mechanism for the registering mechanism, an identification key escutcheon having printing and released positions, rotation of the resetting shaft in either direction serving to actuate the locking mechanism, a stop for limiting rotation of the shaft in a first direction when it reaches a position releasing the locking mechanism and locking the escutcheon in printing position, and a second stop for permitting less rotation of the shaft in a second direction to lock the registering mechanism and release the escutcheon.

81. In a fare recorder, the combination of recording mechanism adapted to print a record in two parts, registering mechanism, resetting mechanism adapted for one direction of motion to reset the registering mechanism and actuate one portion of the recording mechanism and for a second direction of motion to actuate the same portion of the recording mechanism, independent mechanism for actuating the other portion of the recording mechanism, locking mechanism for the registering mechanism, a member operable different amounts in two directions to actuate the locking mechanism, a complete operation in one direction serving to leave the registering mechanism in released condition and a complete operation in the other direction serving to leave the registering mechanism in a locked condition, and two pawls adapted to alternately engage such resetting mechanism to determine its direction of motion, the position of such independent mechanism determining the pawl that is in operative position.

82. In a fare recorder, the combination of fare registering mechanism, mechanism for recording the fares and trip number, independent mechanism for recording the conductor's identification, recorder number and the date, a resetting shaft rotatable in either direction, motion in one direction of such shaft serving to reset the registering mechanism and motion in either direction serving to make a record of the fares registered and the trip number, an independent device for actuating the mechanism for recording the conductor's identification, recorder number and the date, locking mechanism for the registering mechanism, an identification key escutcheon having printing and released positions, rotation of the resetting shaft in either direction serving to actuate the locking mechanism, a stop for limiting rotation of the shaft in a first direction when it reaches a position releasing the locking mechanism and locking the escutcheon in printing position, a second stop for permitting less rotation of the shaft in a second direction to lock the registering mechanism and release the escutcheon, a first pawl for permitting rotation of the shaft in only a first direction, a second pawl for permitting rotation of the shaft only in a second direction, and a lock for maintaining the escutcheon in its printing position for rotation of the shaft in the first direction, such independent device when in its operated position serving to remove the first pawl and bring into operative position the second pawl to permit motion of the shaft in a direction to release such lock, motion of such independent device to its initial position serving to remove the second pawl and again bring into operative position the first pawl.

83. In a fare recorder, the combination of recording mechanism adapted to print a record in two parts, registering mechanism, resetting mechanism adapted for one direction of motion to reset the registering mechanism and actuate one portion of the recording mechanism and for a second direction of motion to actuate the same portion of the recording mechanism, independent mechanism for actuating the other portion of the recording mechanism, a plurality of record strips, and a common supply roll of such strips.

84. In a fare recorder, the combination of fare registering mechanism, mechanism for recording the fares and trip number, independent mechanism for recording the conductor's identification, recorder number and the date, a resetting shaft rotatable in either direction, motion in one direction of such shaft serving to reset the registering mechanism and motion in either direction serving to make a record of the fares registered and the trip number, an independent device for actuating the mechanism for recording the conductor's identification, recorder number and the date, a plurality of record strips, a single supply roll of such strips, and mechanism for making a record on one or more of such strips.

85. In a fare recorder, the combination of recording mechanism adapted to print a record in two lines, registering mechanism, resetting mechanism adapted for one direction of motion to reset the registering mechanism and print a record of one of such lines and for a second direction of motion to print a record of such line, and independent mechanism for printing a record of the other line.

86. In a fare recorder, the combination of mechanism for recording the fares and trip number in one line, independent mechanism for recording the conductor's identification, the recorder number and the date in another line, fare registering mechanism, a resetting shaft rotatable in either direction, motion in one direction of such shaft serving to reset the registering mechanism and motion in either direction serving to make a record of the fares and trip number, and an independent device for making a record of the conductor's identification, the recorder number and the date.

87. In a fare recorder, the combination of recording mechanism adapted to print a record consisting of two different lines, separate mechanisms for printing each line, each by its operation adapted to lock the other, a record strip, and means for advancing the strip a predetermined amount to deliver a completed record from the recorder.

88. In a fare recorder, the combination of mechanism for recording the fares and trip number in one line, separate mechanism for recording the conductor's identification, the recorder number and the date in another line, operation of either recording mechanism serving to lock the other, a record strip, an identification key adapted to make a record on the strip and retained in the recorder during its operating intervals, and manually operable means for advancing the strip after the recording of the identification key an amount to deliver such record from the recorder and release the identification key.

89. In a fare recorder, the combination of recording mechanism adapted to print a record in two lines, independent mechanisms for printing each line, and trip recording mechanism, operation of one of the independent mechanisms in one direction serving to advance the trip recording mechanism and operation of such mechanism in another direction serving to actuate the recording mechanism.

90. In a fare recorder, the combination of mechanism for recording the fares and trip number in one line, independent mechanism for recording the conductor's identification, the recorder number and the date in another line, fare registering mechanism, a resetting shaft rotatable in either direction to operate the trip and fare recording mechanisms, and devices associated with such shaft for advancing the trip recording mechanism and resetting the fare registering mechanism for rotation of the shaft in a first direction, rotation of the shaft in such first direction to its initial position after such shaft has been rotated in the other direction serving only to operate the trip and fare recording mechanism.

91. In a fare recorder, the combination of recording mechanism adapted to print a record in two lines, independent mechanisms for printing each line, a record strip, means for advancing the strip a predetermined amount to deliver a completed record from the recorder, an identification key escutcheon, and means for preventing displacement of the escutcheon to its released position when the key is not in such escutcheon.

92. In a fare recorder, the combination of mechanism for recording the fares and trip number in one line, independent mechanism for recording the conductor's identification, the recorder number and the date in another line, a record strip, an identification key adapted to make a record on the strip and retained in the recorder during its operating intervals, manually operable means for advancing the strip after the recording of the identification key an amount to deliver such record from the recorder and release the identification key, a key escutcheon having printing and released positions, and a spring tumbler for engaging the escutcheon to prevent motion of the escutcheon to its released position when the key is not in the escutcheon, the end of the key so conformed as to engage and support the tumbler out of the path of the escutcheon when the key is in the escutcheon.

93. In a fare recorder, the combination of recording mechanism adapted to print a record consisting of two different lines, separate mechanisms for printing each line, operation of either printing mechanism serving to lock the other, record strips, means for advancing the strip a predetermined amount to deliver a completed record from the recorder, and a common supply roll of such strips.

94. In a fare recorder, the combination of mechanism for recording the fares and trip number in one line, separate mechanism for recording the conductor's identification, the recorder number and the date in another line, operation of either recording mechanism serving to lock the other, record strips, an identification key adapted to make a record on the strips and retained in the recorder during its operating intervals, manually operable means for advancing the strips after the recording of the identification key an amount to deliver such record from the recorder and release the identification key, a single supply roll of such strips, and mechanism for making a record of one or more of such strips.

95. In a fare recorder, the combination of recording mechanism adapted to print a record in two lines, independent mechanisms for printing each line, a record strip, means for advancing the strip a predetermined amount to deliver a completed record from the recorder, and a record feeding device adapted by its operation to separate different portions of the record by impressions made by it upon such record.

96. In a fare recorder, the combination of mechanism for recording the fares and trip number in one line, independent mechanism for recording the conductor's identification, the recorder number and the date in another line, a record strip, an identification key adapted to make a record on the strip and retained in the recorder during its operating intervals, manually operable means for advancing the strip after the recording of the identification key an amount to deliver such record from the recorder and release the identification key, a first feeding roller, and a coöperating feeding roller having flanges thereon adapted to mark the record to divide such record into a plurality of portions.

97. In a fare recorder, the combination of recording mechanism adapted to print a record in two lines, independent mechanisms for printing each line, a record strip, means for advancing the strip a predetermined amount to deliver a completed record from the recorder, a feeding roller, and a pressure device engaging the roller nearer one end than the other.

98. In a fare recorder, the combination of mechanism for recording the fares and trip number in one line, independent mechanism for recording the conductor's identification, the recorder number and the date in another line, a record strip, an identification key adapted to make a record on the strip and retained in the recorder during its operating intervals, manually operable means for advancing the strip after the recording of the identification key an amount to deliver such record from the recorder and release the identification key, feeding rollers for such strip, gearing between the rollers at one end, and spring mechanism exerting a greater pressure between the rollers at the gearing end than at the other end to compensate for the thrust of the gearing.

99. In a fare recorder, the combination of recording mechanism adapted to print a record in two lines, separate mechanisms for printing each line, operation of either printing mechanism serving to lock the other, a record strip, and a record feeding device adapted by its operation to separate different portions of the record by impressions made by it upon such record.

100. In a fare recorder, the combination of mechanism for recording the fares and trip number in one line, separate mechanism for recording the conductor's identification, the recorder number and the date in another line, operation of either recording mechanism serving to lock the other, a record strip, a first feeding roller, and a coöperating feeding roller having flanges thereon adapted to mark the record to divide such record into a plurality of portions.

101. In a fare recorder, the combination of recording mechanism adapted to print a record in two lines, independent mechanisms for printing each line, a record strip, a feeding roller, and a pressure device engaging the roller nearer one end than the other.

102. In a fare recorder, the combination of mechanism for recording the fares and trip number in one line, independent mechanism for recording the conductor's identification, the recorder number and the date in another line, a record strip, feeding rollers for such strip, gearing between the rollers at one end, and spring mechanism exerting a greater pressure between the rollers at the gearing end than at the other end to compensate for the thrust of the gearing.

103. In a fare recorder, the combination of recording mechanism adapted to print a record in two lines, independent mechanisms for printing each line, a record strip, a record feeding roller adapted by its operation to separate different portions of the record by impressions made by it upon such record, and a pressure device engaging the roller nearer one end than the other.

104. In a fare recorder, the combination of mechanism for recording the fares and trip number in one line, independent mechanism for recording the conductor's identification, the recorder number and the date in another line, a record strip, a first feeding roller, a coöperating feeding roller having flanges thereon adapted to mark the record to divide such record into a plurality of portions, gearing between the rollers at one end, and spring mechanism exerting a greater pressure between the rollers at the gearing end than at the other end to compensate for the thrust of the gearing.

105. In a fare recorder, the combination of recording mechanism adapted to print a record in two lines, resetting mechanism adapted by its actuation to print one of such lines, and an independent member for printing the other of such lines.

106. In a fare recorder, the combination of mechanism for recording the fares and trip number in one line, independent mechanism for recording the conductor's identification, the recorder number and the date in another line, a register resetting shaft adapted when rotated in either direction to record the fares and trip number, and a sliding bar independently operable for recording the conductor's identification, the recorder number and the date.

107. In a fare recorder, the combination of recording mechanism adapted to print a record in two lines, resetting mechanism adapted by its actuation to print one of such lines, an independent member for printing the other of such lines, and two pawls adapted to alternately engage such resetting mechanism to determine its direction of motion, such independent member by its position determining the pawl that is in operative position.

108. In a fare recorder, the combination of mechanism for recording the fares and trip number in one line, independent mechanism for recording the conductor's identification, the recorder number and the date in another line, a register resetting shaft adapted when rotated in either direction to record the fares and trip number, a sliding bar independently operable for recording the conductor's identification, the recorder number and the date, a first pawl for permitting rotation of the shaft in only a first direction, a second pawl for permitting rotation of the shaft only in a second direction, an identification key escutcheon having printing and released positions, and a lock for maintaining the escutcheon in its printing position for rotation of the shaft in the first direction, such bar when in its operated position serving to remove the first pawl and to bring into operative position the second pawl to permit motion of the shaft in a direction to release such lock, motion of such bar to its initial position serving to remove the second pawl and again bring into operative position the first pawl.

109. In a fare recorder, the combination of recording mechanism adapted to print a record in two lines, resetting mechanism adapted by its actuation to print one of such lines, an independent member for printing the other of such lines, a key escutcheon having printing and released positions, a tumbler having two positions operative to retain the escutcheon in its printing position, a stop for preventing motion of such resetting mechanism after one complete operation, and means for moving the resetting mechanism from engagement with the stop.

110. In a fare recorder, the combination of mechanism for recording the fares and trip number in one line, independent mechanism for recording the conductor's identification, the recorder number and the date in another line, a register resetting shaft adapted when rotated in either direction to record the fares and trip number, a sliding bar independently operable for recording the conductor's identification, the recorder number and the date, an identification key escutcheon having printing and released positions, independent tumblers each having two operative positions to retain the escutcheon in printing position, devices controlled by the resetting shaft for moving the tumblers to one operative position during a resetting operation and to the other operative position at the end of such operation, such tumblers adapted to be held in an inoperative position by a proper key in the escutcheon and serving when in one operative position to prevent insertion of a key into the escutcheon, a stop adapted to repeatedly limit rotation of the shaft in the same direction for successive resetting operations and means for moving the resetting shaft from engagement with the stop.

111. In a fare recorder, the combination of recording mechanism adapted to print a record in two lines, resetting mechanism adapted by its actuation to print one of such lines, an independent member for printing the other of such lines, two pawls adapted to alternately engage such resetting mechanism to determine its direction of motion, such independent member by its position determining the pawl that is in operative position, a key escutcheon having printing and released positions, a tumbler having two positions operative to retain the escutcheon in its printing position, a stop for limiting the motion of the resetting mechanism preventing motion of such resetting mechanism after one complete operation, and means for moving the resetting mechanism from engagement with the stop.

112. In a fare recorder, the combination of mechanism for recording the fares and trip number in one line, independent mechanism for recording the conductor's identification, the recorder number and the date in another line, a register resetting shaft adapted when rotated in either direction to record the fares and trip number, a sliding bar independently operable for recording the conductor's identification, the recorder number and the date, a first pawl for permitting rotation of the shaft in only a first direction, a second pawl for permitting rotation of the shaft only in a second direction, an identification key escutcheon having printing and released positions, a lock for maintaining the escutcheon in its printing position for rotation of the shaft in the first direction, such bar when in its operated position serving to remove the first pawl to permit motion of the shaft in a direction to release such lock, motion of such bar to its initial position serving to remove the second pawl and again bring into operative position the first pawl, a tumbler having two operative positions to prevent motion of the escutcheon, motion of the resetting shaft serving to move the tumbler from one of such positions to the other, a stop adapted to repeatedly limit rotation of the shaft in the same direction for successive resetting operations and means for moving the resetting shaft from engagement with the stop.

113. In a fare recorder, the combination of fare recording mechanism, registering mechanism, trip recording mechanism, and resetting mechanism operable in either of two directions to actuate the fare and trip recording mechanisms, motion of such resetting mechanism in one direction serving to reset the registering mechanism and advance the trip recording mechanism.

114. In a fare recorder, the combination of fare registering mechanism, recording mechanism, a resetting shaft rotatable in either direction, motion in one direction of such shaft serving to reset the registering mechanism and motion in either direction serving to actuate the recording mechanism to make a record of the fares registered, a plurality of record strips, a single supply roll of such strips, and mechanism for making a record on one or more of such strips.

115. In a fare recorder, the combination of trip recording mechanism, an actuating member for the recorder operable in two directions, operation of such member in one direction serving to advance the trip recording mechanism and operation of such member in the other direction serving to actuate the recording mechanism, a key escutcheon, an identification key for making part of the complete record, and means for preventing displacement of the escutcheon to its released position when the key is not in such escutcheon.

116. In a fare recorder, the combination of trip recording mechanism, fare recording mechanism, fare registering mechanism, a resetting shaft rotatable in either direction to operate the trip and fare recording mechanisms, devices associated with such shaft for advancing the trip recording mechanism and resetting the fare registering mechanism for rotation of the shaft in a first direction, rotation of the shaft in such first direction to its initial position after such shaft has been rotated in the other direction serving only to operate the trip and fare recording mechanisms, a key escutcheon having printing and released positions, an identification key for making part of the complete record, and a spring tumbler for engaging the escutcheon to prevent motion of the escutcheon to its released position when the key is not in the escutcheon, the end of the key so conformed as to engage and support the tumbler out of the path of the escutcheon when the key is in the escutcheon.

117. In a fare recorder, the combination of trip recording mechanism, an actuating member for the recorder operable in two directions, operation of such member in one direction serving to advance the trip recording mechanism and operation of such member in the other direction serving to actuate the recording mechanism, a conductor's identification key for making part of the complete record, and an independent member for making a record from such key.

118. In a fare recorder, the combination of trip recording mechanism, fare recording mechanism, fare registering mechanism, a resetting shaft rotatable in either direction to operate the trip and fare recording mechanism, devices associated with such shaft for advancing the trip recording mechanism and resetting the fare registering mechanism for rotation of the shaft in a first direction, rotation of the shaft in such first direction to its initial position after such shaft has been rotated in the other direction serving only to operate the trip and fare recording mechanisms, an identification key for making a part of the complete record, and a sliding bar independently operable for making a record of such key.

119. In a fare recorder, the combination of trip recording mechanism, an actuating member for the recorder operable in two directions, operation of such member in one direction serving to advance the trip recording mechanism and operation of such member in the other direction serving to actuate the recording mechanism, and an independent printing member adapted by its operation to control the direction of motion of the actuating member.

120. In a fare recorder, the combination of trip recording mechanism, fare recording mechanism, fare registering mechanism, a resetting shaft rotatable in either direction to operate the trip and fare recording mechanisms, devices associated with such shaft for advancing the trip recording mechanism and resetting the fare registering mechanism for rotation of the shaft in a first direction, rotation of the shaft in such first direction to its initial position after such shaft has been rotated in the other direction serving only to operate the trip and fare recording mechanisms, devices for normally permitting motion of the shaft in such first direction only, an identification key escutcheon having printing and released positions, a lock for maintaining the escutcheon in its printing position for motion of the resetting shaft in such first direction, and a sliding bar for making a record of the identification key, such bar when in its operated position serving to move the last named devices to permit motion of the resetting shaft only in a second direction to release such lock.

121. In a fare recorder, the combination of trip recording mechanism, an actuating member for the recorder operable in two directions, operation of such member in one direction serving to advance the trip recording mechanism and operation of such member in the other direction serving to actuate the recording mechanism, two pawls adapted to alternately engage such actuating member to determine its direction of motion, and a printing member adapted by its position to determine the pawl that is in operative position.

122. In a fare recorder, the combination of trip recording mechanism, fare recording mechanism, fare registering mechanism, a resetting shaft rotatable in either direction to operate the trip and fare recording mechanisms, devices associated with such shaft for advancing the trip recording mechanism and resetting the fare registering mechanism for rotation of the shaft in a first direction, rotation of the shaft in such first direction to its initial position after such shaft has been rotated in the other direction serving only to operate the trip and fare recording mechanisms, a first pawl for permitting rotation of the shaft in only a first direction, a second pawl for permitting rotation of the shaft only in a second direction, an identification key escutcheon having printing and released positions, a lock for maintaining the escutcheon in its printing position for rotation of the shaft in the first direction, and a sliding bar for making a record of the identification key, such bar when in its operated position serving to remove the first pawl and to bring into operative position the second pawl to permit motion of the shaft in a direction to release such lock, motion of such bar to its initial position serving to remove the second pawl and again bring into operative position the first pawl.

123. In a fare recorder, the combination of trip recording mechanism, an actuating member for the recorder operable in two directions, operation of such member in one direction serving to advance the trip recording mechanism and operation of such member in the other direction serving to actuate the recording mechanism, a key escutcheon having printing and released positions, and a tumbler having two positions operative to retain the escutcheon in its printing position.

124. In a fare recorder, the combination of trip recording mechanism, fare recording mechanism, fare registering mechanism, a resetting shaft rotatable in either direction to operate the trip and fare recording mechanisms, devices associated with such shaft for advancing the trip recording mechanism and resetting the fare registering mechanism for rotation of the shaft in a first direction, rotation of the shaft in such first direction to its initial position after such shaft has been rotated in the other direction serving only to operate the trip and fare recording mechanism, an identification key escutcheon having printing and released positions, independent tumblers each having two operative positions to retain the escutcheon in printing position, and devices controlled by the resetting shaft for moving the tumblers to one operative position during a resetting operation and to the other operative position at the end of such operation, such tumblers adapted to be held in an inoperative position by a proper key in the escutcheon and serving when in one operative position to prevent insertion of a key into the escutcheon.

125. In a fare recorder, the combination of trip recording mechanism, an actuating member for the recorder operable in two directions, operation of such member in one direction serving to advance the trip recording mechanism and operation of such member in the other direction serving to actuate the recording mechanism, a stop for preventing motion of such actuating member after one complete operation, and means for moving the actuating member from engagement with the stop.

126. In a fare recorder, the combination of trip recording mechanism, fare recording mechanism, fare registering mechanism, a resetting shaft rotatable in either direction to operate the trip and fare recording mechanisms, devices associated with such shaft for advancing the trip recording mechanism and resetting the fare registering mechanism for rotation of the shaft in a first direction, rotation of the shaft in such first direction to its initial position after such shaft has been rotated in the other direction serving only to operate the trip and fare recording mechanisms, a stop adapted to repeatedly limit the rotation of the shaft in the same direction for successive resetting operations and means for moving the resetting shaft from engagement with the stop.

127. In a fare recorder, the combination of recording mechanism, registering mechanism, locking mechanism for the registering mechanism, a resetting member operable different amounts in two directions to actuate the locking mechanism, a complete operation in one direction serving to reset the registering mechanism, actuate the recording mechanism and leave the registering mechanism in released condition and a complete operation in the other direction serving to actuate the recording mechanism and leave the registering mechanism in locked condition, two pawls adapted to alternately engage such resetting member to determine its direction of motion, and an independent printing member adapted by its position to determine the pawl that is in operative position.

128. In a fare recorder, the combination of registering mechanism, recording mechanism, locking mechanism for the registering mechanism, an identification key escutcheon having printing and released positions, a resetting shaft rotatable in both directions to actuate the locking mechanism and the recording mechanism, a stop for limiting rotation of the shaft in a first direction when it reaches a position releasing the locking mechanism and locking the escutcheon in printing position, a second stop for permitting less rotation of the shaft in a second direction to lock the registering mechanism and release the escutcheon, motion of the shaft in the first direction serving to reset the registering mechanism, a first pawl for permitting rotation of the shaft in only the first direction, a second pawl for permitting rotation of the shaft only in the second direction, and a sliding bar for making a record of the identification key, such bar when in its operated position serving to remove the first pawl and bring into operative position the second pawl to permit motion of the shaft in a direction to release such lock, motion of such bar to its initial position serving to remove the second pawl and again bring into operative position the first pawl.

129. In a fare recorder, the combination of recording mechanism, registering mechanism, locking mechanism for the registering mechanism, a resetting member operable different amounts in two directions to actuate the locking mechanism, a complete operation in one direction serving to reset the registering mechanism, actuate the recording mechanism and leave the registering mechanism in released condition and a complete operation in the other direction serving to actuate the recording mechanism and leave the registering mechanism in locked condition, a key escutcheon having printing and released positions, a tumbler having two positions operative to retain the escutcheon in its printing position, and a removable stop for limiting the motion of such resetting member.

130. In a fare recorder, the combination of registering mechanism, recording mechanism, locking mechanism for the registering mechanism, an identification key escutcheon having printing and released positions, a resetting shaft rotatable in both directions to actuate the locking mechanism and the recording mechanism, a stop for limiting rotation of the shaft in a first direction when it reaches a position releasing the locking mechanism and locking the escutcheon in printing position, a second stop for permitting less rotation of the shaft in a second direction to lock the registering mechanism and release the escutcheon, motion of the shaft in the first direction serving to reset the registering mechanism, independent tumblers each having two operative positions to retain the escutcheon in printing position, devices controlled by the resetting shaft for moving the tumblers to one operative position during a resetting operation and to the other operative position at the end of such operation, such tumblers adapted to be held in an inoperative position by a proper key in the escutcheon and serving when in one operative position to prevent insertion of a key into the escutcheon, and a removable stop adapted to repeatedly limit rotation of the shaft in the same direction for successive resetting operations.

131. In a fare recorder, the combination of mechanism for recording the fares, and separate mechanism for recording the conductor's identification and the date the operation of either recording mechanism serving to lock the other.

132. In a fare recorder, the combination of mechanism for recording the fares, and separate mechanism for recording the recorder number, the conductor's identification, and the date the operation of either recording mechanism serving to lock the other.

133. In a fare recorder, the combination of mechanism for recording the fares, and separate mechanism for recording the recorder number, operation of either recording mechanism serving to lock the other.

134. In a fare recorder, the combination of mechanism for recording the fares, and separate mechanism for recording the date, operation of either recording mechanism serving to lock the other.

135. In a fare recorder, the combination of mechanism for recording the fares and trip number, and separate mechanism for recording the recorder number and the date, operation of either recording mechanism serving to lock the other.

136. In a fare recorder, the combination of mechanism for recording the fares and trip number, and separate mechanism for recording the recorder number and the conductor's identification, operation of either recording mechanism serving to lock the other.

137. In a fare recorder, the combination of mechanism for recording the fares and trip number, and separate mechanism for recording the conductor's identification and the date, the operation of either recording mechanism serving to lock the other.

138. In a fare recorder, the combination of mechanism for recording the fares and trip number, and separate mechanism for recording the conductor's identification, operation of either recording mechanism serving to lock the other.

139. In a fare recorder, the combination of mechanism for recording the fares and trip number, and separate mechanism for recording the recorder number, operation of either recording mechanism serving to lock the other.

140. In a fare recorder, the combination of mechanism for recording the fares and trip number, and separate mechanism for recording the date, operation of either recording mechanism serving to lock the other.

141. In a fare recorder, the combination of mechanism for recording the fares in one line, and separate mechanism for recording the recorder number and the date in another line, operation of either recording mechanism serving to lock the other.

142. In a fare recorder, the combination of mechanism for recording the fares in one line, and separate mechanism for recording the recorder number and the conductor's identification in another line, operation of either recording mechanism serving to lock the other.

143. In a fare recorder, the combination of mechanism for recording the fares in one line, and separate mechanism for recording the conductor's identification and the date in another line, operation of either recording mechanism serving to lock the other.

144. In a fare recorder, the combination of mechanism for recording the fares in one line, and separate mechanism for recording the recorder number, the conductor's identification, and the date in another line, operation of either recording mechanism serving to lock the other.

145. In a fare recorder, the combination of mechanism for recording the fares in one line, and separate mechanism for recording the recorder number in another line, operation of either recording mechanism serving to lock the other.

146. In a fare recorder, the combination of mechanism for recording the fares in one line, and separate mechanism for recording the date in another line, operation of either recording mechanism serving to lock the other.

147. In a fare recorder, the combination of mechanism for recording the fares and trip number in one line, and separate mechanism for recording the recorder number and the date in another line, operation of either recording mechanism serving to lock the other.

148. In a fare recorder, the combination of mechanism for recording the fares and trip number in one line, and separate mechanism for recording the recorder number and the conductor's identification in another line, operation of either recording mechanism serving to lock the other.

149. In a fare recorder, the combination of mechanism for recording the fares and trip number in one line, and separate mechanism for recording the conductor's identification and the date in another line, operation of either recording mechanism serving to lock the other.

150. In a fare recorder, the combination of mechanism for recording the fares and trip number in one line, and separate mechanism for recording the recorder number in another line, operation of either recording mechanism serving to lock the other.

151. In a fare recorder, the combination of mechanism for recording the fares and trip number in one line, and separate mechanism for recording the date in another line, operation of either recording mechanism serving to lock the other.

152. In a fare recorder, the combination of mechanism for recording the fares and trip number in one line, and separate mechanism for recording the conductor's identification in another line, operation of either recording mechanism serving to lock the other.

153. In a fare recorder, the combination of fare registering mechanism, means for recording the readings of the registering mechanism, recording mechanism separate from the fare recording means, a first member adapted to actuate the register-recording means when operated in either of two directions, and a second member for actuating the separate recording mechanism.

154. In a fare recorder, the combination of fare registering mechanism, means for recording the readings of the registering mechanism, register-resetting mechanism adapted to actuate the register-recording means, recording mechanism separate from the fare recording means, and a member independently operable for actuating the separate recording mechanism.

155. In combination, a record strip, delivery rolls for feeding said record strip, recording mechanism, a plurality of means for operating said recording mechanism and said delivery rolls, operation of one of said means causing a record to be printed and the record to be advanced an amount insufficient to pass said delivery rolls, operation of another of said means causing a record to be printed and causing the rolls to advance said strip to expose the record made outside of said delivery rolls.

156. In combination, a record strip, delivery rolls, recording mechanism, means for operating said recording mechanism and operating said delivery rolls a relatively small amount insufficient to bring the record made thereby to the delivery rolls, and other means for operating said recording mechanism and operating said rolls a relatively greater amount to feed said record out of said delivery rolls.

157. In combination, a record strip, delivery rolls for feeding said record strip, recording mechanism, said mechanism including means for printing the operator's identification character, means for operating said recording mechanism and operating said delivery rolls a relatively small amount insufficient to bring the record made thereby to the delivery rolls, and other means for operating said recording mechanism and operating said rolls a relatively greater amount to feed said record out of said delivery rolls, said latter means causing a record of the operator's identifying number to be made.

158. In combination, a record strip, feeding rolls therefor, recording mechanism including an operator's number key, a plurality of means for feeding said record strip, one of said means causing printing of a record of the fares taken, another of said means causing printing of said number key and causing delivery of the record from the feeding rolls at the same operation and means for invariably compelling printing of the fare record before the latter means can be operated.

159. In combination, a record strip, a trip register, an operator's identification key, independent recorders for recording the trip record and the key record on said record strip, feeding means operated by said recording means, said feeding means being operated to a greater extent for a record taken of the key number than for a record taken of the trip number and means for insuring the operation of said trip number recording means prior to operation of said key number recording means.

In witness whereof, I hereunto subscribe my name this 7th day of July, A. D. 1910.

WILLIAM G. KIRCHHOFF.

Witnesses:
ARTHUR H. WOODWARD,
ALBERT C. BELL.

It is hereby certified that in Letters Patent No. 1,256,908, granted February 19, 1918, upon the application of William G. Kirchhoff, of Chicago, Illinois, for an improvement in "Fare-Recorders," errors appear in the printed specification requiring correction as follows: Page 25, line 83, claim 94, for the word "of" read *on;* page 27, lines 49–50, claim 111, strike out the words "limiting the motion of the resetting mechanism;" and that the said Letters Patent should be read with these corrections therein that the same may conform to the record of the case in the Patent Office.

Signed and sealed this 16th day of April, A. D., 1918.

[SEAL.]

F. W. H. CLAY,
*Acting Commissioner of Patents.*

Cl. 234—4.